(12) United States Patent
Chhabra et al.

(10) Patent No.: US 9,767,044 B2
(45) Date of Patent: Sep. 19, 2017

(54) SECURE MEMORY REPARTITIONING

(71) Applicant: Intel Corporation, Santa Clara, CA (US)

(72) Inventors: Siddhartha Chhabra, Hillsboro, OR (US); Uday R. Savagaonkar, Portland, OR (US); Michael A. Goldsmith, Lake Oswego, OR (US); Simon P. Johnson, Beaverton, OR (US); Rebekah M. Leslie-Hurd, Portland, OR (US); Francis X. McKeen, Portland, OR (US); Gilbert Neiger, Portland, OR (US); Raghunandan Makaram, Northborough, MA (US); Carlos V. Rozas, Portland, OR (US); Amy L. Santoni, Scottsdale, AZ (US); Vincent R. Scarlata, Beaverton, OR (US); Vedvyas Shanbhogue, Austin, TX (US); Wesley H. Smith, Raleigh, NC (US); Ittai Anati, Haifa (IL); Ilya Alexandrovich, Haifa (IL)

(73) Assignee: Intel Corporation, Santa Clara, CA (US)

( * ) Notice: Subject to any disclaimer, the term of this patent is extended or adjusted under 35 U.S.C. 154(b) by 543 days.

(21) Appl. No.: 14/034,813

(22) Filed: Sep. 24, 2013

(65) Prior Publication Data
US 2015/0089173 A1 Mar. 26, 2015

(51) Int. Cl.
*G06F 12/00* (2006.01)
*G06F 12/14* (2006.01)
(Continued)

(52) U.S. Cl.
CPC ...... *G06F 12/1408* (2013.01); *G06F 9/45558* (2013.01); *G06F 12/0808* (2013.01);
(Continued)

(58) Field of Classification Search
CPC ....... G06F 12/1408; G06F 2009/45587; G06F 9/45558; G06F 12/1027; G06F 12/0808;
(Continued)

(56) References Cited

U.S. PATENT DOCUMENTS

| 6,976,175 B2* | 12/2005 | England | G06Q 10/10 705/51 |
| 7,124,274 B2* | 10/2006 | Watt | G06F 9/4812 711/163 |

(Continued)

FOREIGN PATENT DOCUMENTS

| WO | 03/050688 A2 | 6/2003 |
| WO | 2011-078855 A1 | 6/2011 |

OTHER PUBLICATIONS

International Search Report & Written Opinion mailed on Dec. 17, 2014, on application No. PCT/US2014/055807.
(Continued)

*Primary Examiner* — David X Yi
*Assistant Examiner* — Francisco Grullon
(74) *Attorney, Agent, or Firm* — Lowenstein Sandler LLP

(57) ABSTRACT

Secure memory repartitioning technologies are described. A processor includes a processor core and a memory controller coupled between the processor core and main memory. The main memory includes a memory range including a section of convertible pages that are convertible to secure pages or non-secure pages. The processor core, in response to a page conversion instruction, is to determine from the instruction a convertible page in the memory range to be converted and convert the convertible page to be at least one of a secure page or a non-secure page. The memory range may also include a hardware reserved section that is convertible in response to a section conversion instruction.

25 Claims, 13 Drawing Sheets

(51) Int. Cl.
*G06F 12/0808* (2016.01)
*G06F 12/1027* (2016.01)
*G06F 9/455* (2006.01)
*G06F 12/0897* (2016.01)

(52) U.S. Cl.
CPC ...... *G06F 12/1027* (2013.01); *G06F 12/0897* (2013.01); *G06F 2009/45587* (2013.01); *G06F 2212/1032* (2013.01); *G06F 2212/1048* (2013.01); *G06F 2212/152* (2013.01)

(58) Field of Classification Search
CPC ..... G06F 2212/1032; G06F 2212/1048; G06F 12/0897; G06F 2212/152; G06F 12/0802; G06F 12/145
See application file for complete search history.

(56) References Cited

U.S. PATENT DOCUMENTS

| | | | | |
|---|---|---|---|---|
| 7,146,477 B1* | 12/2006 | Strongin | ............ | G06F 12/1475 709/229 |
| 7,219,369 B2* | 5/2007 | Hashimoto | ......... | G06F 12/1475 711/163 |
| 7,412,579 B2* | 8/2008 | O'Connor | ........... | G06F 12/1441 710/107 |
| 7,444,523 B2* | 10/2008 | Morais | .................... | G06F 21/78 713/181 |
| 7,886,098 B2* | 2/2011 | Kershaw | ............ | G06F 12/1491 361/1 |
| 2004/0003321 A1* | 1/2004 | Glew | ....................... | G06F 21/74 714/27 |
| 2006/0087893 A1* | 4/2006 | Nishihara | ........... | G06F 12/0246 365/145 |
| 2007/0136577 A1* | 6/2007 | Bade | ....................... | G06F 21/57 713/164 |
| 2008/0235534 A1* | 9/2008 | Schunter | ............... | G06F 12/145 714/6.13 |
| 2008/0294848 A1* | 11/2008 | Harris | .................... | G06F 12/084 711/141 |
| 2009/0293132 A1 | 11/2009 | Henry et al. | | |
| 2010/0031370 A1* | 2/2010 | Ellison | .................. | G06F 21/575 726/27 |
| 2010/0125708 A1 | 5/2010 | Hall et al. | | |
| 2011/0191562 A1* | 8/2011 | Chou | ...................... | G06F 12/14 711/163 |
| 2011/0208935 A1* | 8/2011 | Grisenthwaite | ........ | G06F 12/145 711/163 |
| 2011/0283071 A1* | 11/2011 | Yokoya | .................. | G06F 1/3275 711/162 |
| 2012/0159184 A1* | 6/2012 | Johnson | .............. | G06F 12/1466 713/189 |
| 2012/0163589 A1* | 6/2012 | Johnson | .................. | G06F 21/10 380/30 |
| 2012/0216049 A1* | 8/2012 | Boivie | .................... | G06F 21/57 713/189 |
| 2013/0160133 A1* | 6/2013 | Avgerinos | ............... | G06F 21/57 726/26 |
| 2013/0232345 A1 | 9/2013 | Johnson et al. | | |
| 2014/0089617 A1* | 3/2014 | Polzin | .................... | G06F 12/14 711/163 |

OTHER PUBLICATIONS

Supplementary European Search Report dated Apr. 4, 2017, on application No. EP 14 84 9831.

* cited by examiner

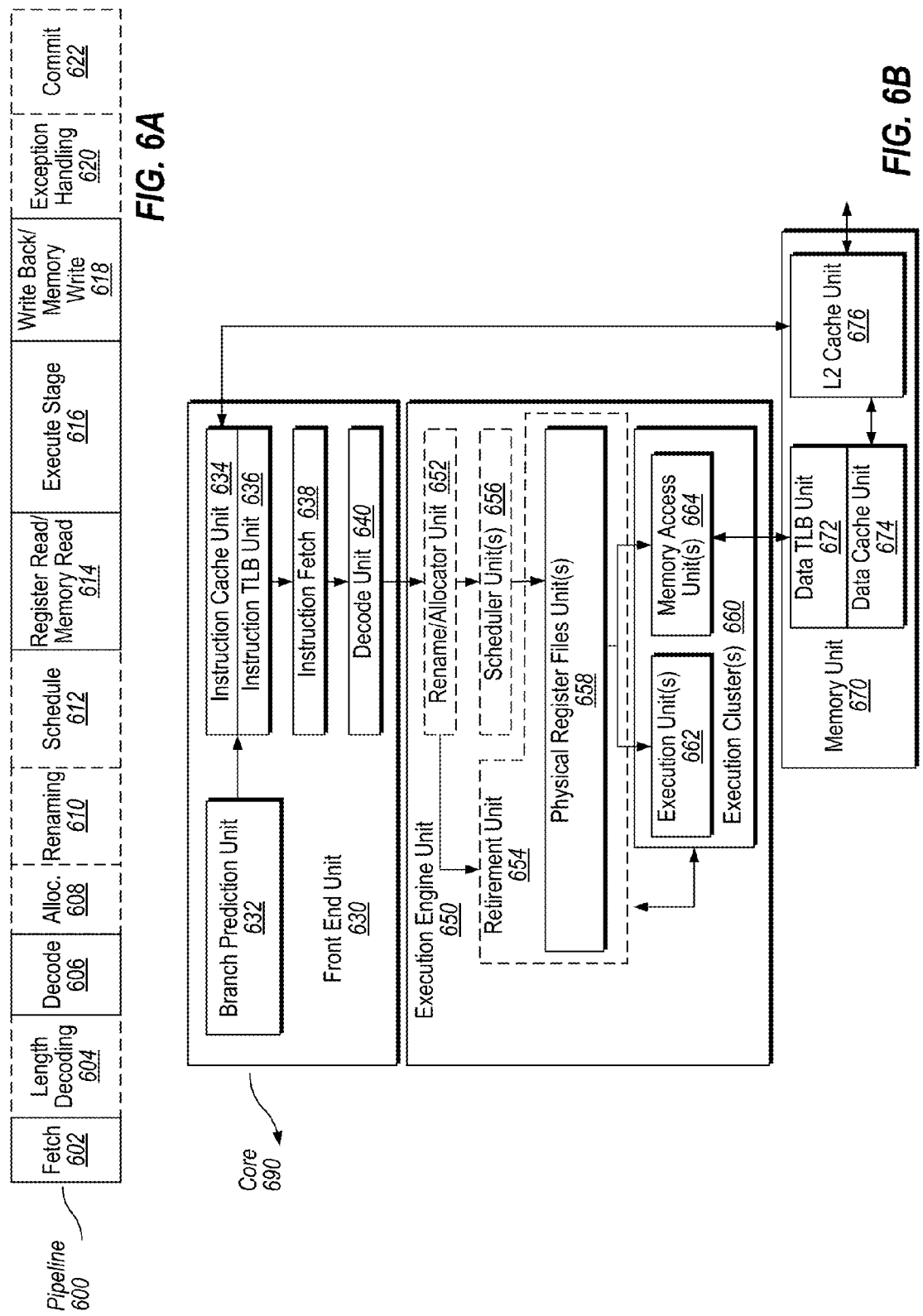

SECURE MEMORY REPARTITIONING

The present disclosure pertains to computer systems; more specifically, to protection of data stored in the memory of a computer system.

BACKGROUND

Modern processors are designed to protect sensitive data in memory from both hardware and software attacks. Some processors provide cryptographic mechanisms for encryption, integrity, and replay protection. Memory encryption protects the confidentiality of memory-resident data. On the other hand, integrity protection prevents an attacker from causing any hidden modifications to the ciphertext (i.e., encrypted data, as opposed to plaintext which is unencrypted data) in memory, and replay protection eliminates any undetected temporal substitution of the ciphertext. In the absence of such protections, an attacker with physical access to the system can record snapshots of data lines and replay them at a later point in time.

BRIEF DESCRIPTION OF THE DRAWINGS

FIG. 6A is a block diagram illustrating an in-order pipeline and a register renaming stage, out-of-order issue/execution pipeline according to one embodiment.

FIG. 6B is a block diagram illustrating a micro-architecture for a processor that implements secure memory repartitioning according to one embodiment.

DESCRIPTION OF EMBODIMENTS

Figure 1:
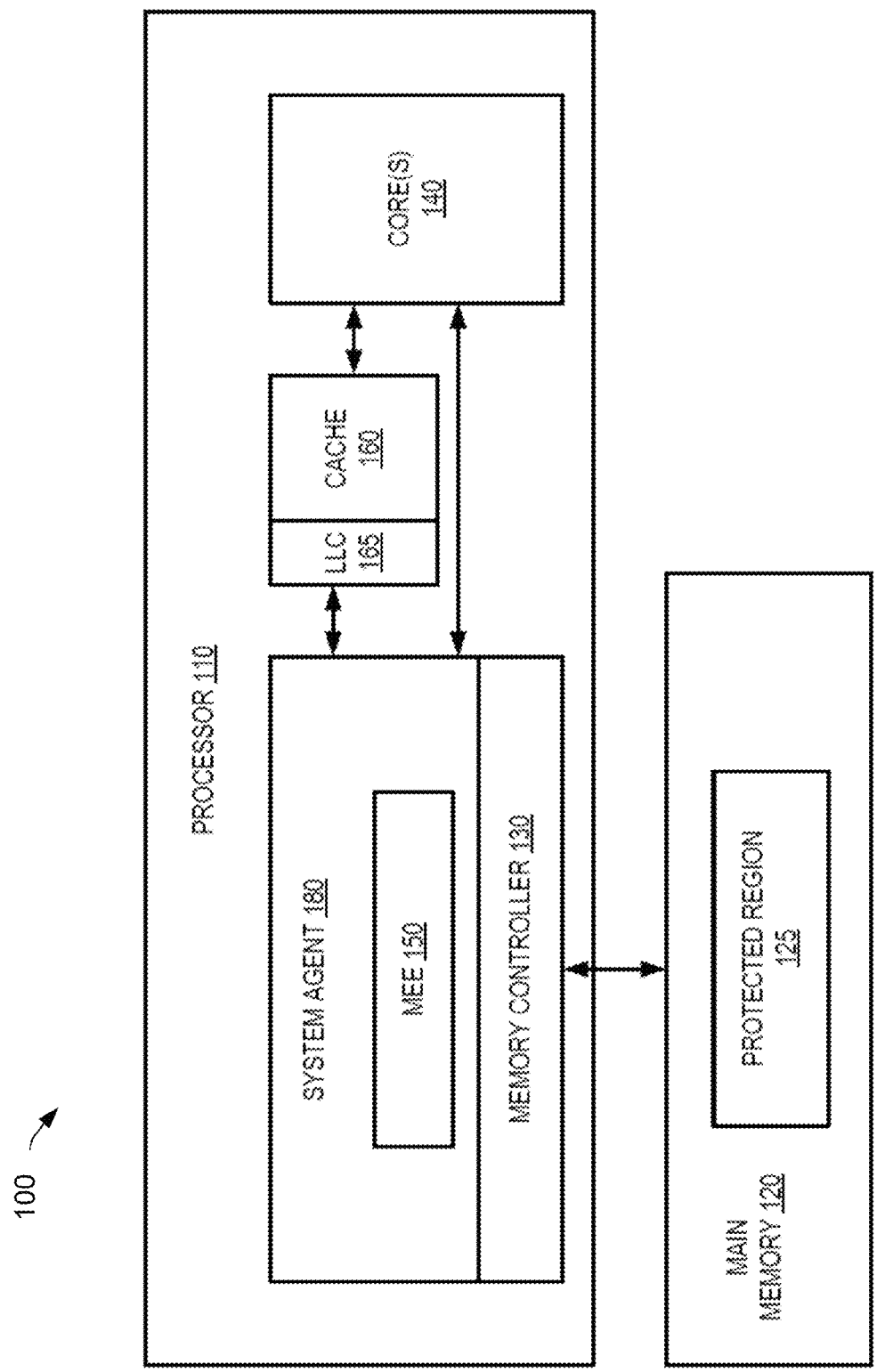
FIG. 1 is a block diagram illustrating a computing system that implements a memory encryption engine (MEE) for implementing secure memory according to one embodiment.

Secure memory repartitioning technologies are described. A processor includes a processor core and a memory controller coupled between the processor core and main memory. The memory range comprises multiple sections of convertible pages that can be converted to secure pages or non-secure pages. Software executing on the processor can identify a page in main memory to be converted and can use a page conversion instruction to convert the page. The processor core, in response to a page conversion instruction, is to determine from the instruction the convertible page in memory range to be converted and convert the convertible page to be a secure page or a non-secure page. It is the responsibility of system software (e.g., OS or VMM) to identify a page that can be converted. For example, if the OS needs a non-secure page, it identifies a secure page (if a non-secure page is not available) and executes the page conversion instruction on this secure page. The memory range may also include multiple convertible sections (also referred to herein as hardware reserved sections) that can be converted in response to a section conversion instruction as described herein.

Memory encryption protects the confidentiality of memory-resident data. Memory encryption is primarily designed to protect against passive attacks where an attacker tries to silently observe the data lines as the data lines move on and off the processor die. Some processors include an encryption module that encrypts sensitive data before the data is stored into a protected region of the memory. On a memory read to the protected region, the data line is decrypted before being fed into the processor. The encryption and decryption algorithms can be chosen based on the security level required by the user.

The embodiments described herein can be used to create secure containers, referred to herein as Secure Enclaves (SEs). The SEs are designed to protect third-party secrets from both hardware and software attacks. SE can protect the confidentiality of enclave secrets by ensuring that the enclave secrets are stored encrypted when resident in platform memory. In order to provide complete protection from hardware attacks, SE needs to provide integrity protection and replay protection. In the absence of such protections, an attacker with physical access to the system can record snapshots of enclave cache lines and replay them at a later point in time. In order to achieve these protections, SE employs a memory encryption engine (MEE), which provides cryptographic mechanisms for encryption, integrity, and replay protection. The MEE is a hardware unit that implements the cryptographic functionality to secure pages when they are in memory. More specifically, the MEE can encrypt any cache line that gets evicted out of the processor if it belongs to a secure page and the MEE also provides integrity protection and replay-protection for the secure pages. Conventional strategies reserve a range of platform memory statically at boot time and enforce the cryptographic protections only on this range of memory. This secure memory range is referred to as the Enclave Page Cache (EPC). Enclave memory requests are satisfied from the EPC.

The static partitioning of memory can create problems if the partitioning requirements change overtime. As an example, a data center performing transaction processing in the day and switching to movie streaming in the night can have drastically different requirements for secure memory based on these workloads running on the datacenter. In one implementation, 128 MB of system memory is reserved as EPC. However, in order to allow secure server applications to use SE efficiently, a large EPC would be needed. With current static partitioning, this would require a multi-gigabyte partition of system memory to be reserved as EPC which cannot be reclaimed for non-secure uses. In addition, mobile devices with limited system memory may require dynamic re-partitioning of memory to allow the secure memory to be reclaimed for non-secure usages.

The embodiments described herein provide a flexible EPC architecture, which provides an operating system (OS) accessible, page-granular (or section-granular) conversion instructions. The flexible EPC architecture defines the EPC as convertible memory on the platform that can be either secure or non-secure and introduces new protection mechanisms, such as a new ring-0 leaf functions for management of convertible memory. The embodiments described herein that use flexible EPC allow dynamic repartitioning of EPC memory, making SE implementations more efficient on servers requiring large amounts of EPC memory and on mobile platforms with limited memory systems.

FIG. 1 is a block diagram illustrating a computing system 100 that implements a memory encryption engine (MEE) 150 for implementing secure memory according to one embodiment. The secure memory ranges (also referred to as the convertible ranges) may be setup at boot time by a basic input-output system (BIOS). The processor 110 executes instructions to convert pages in these convertible ranges as guided by software executing on the processor 110, such as an operating system (OS) or a virtual machine monitor (VMM), as described herein. Also, the memory protections afforded by the MEE are transparent in the sense that the processor does not have to execute any instructions for providing confidentiality, integrity and replay protections. For example, when any cache line belonging to a secure page is evicted, the MEE automatically provides these protections to that cache line. The processor 110 may be used in a system that includes, but is not limited to, a desktop computer, a tablet computer, a laptop computer, a netbook, a notebook computer, a personal digital assistant (PDA), a server, a workstation, a cellular telephone, a mobile computing device, a smart phone, an Internet appliance or any other type of computing device. In another embodiment, the processor 110 may be used in a system on a chip (SoC) system.

The computing system 100 is representative of processing systems based on the PENTIUM III™, PENTIUM 4™, Xeon™, Itanium, XScale™ and/or StrongARM™ microprocessors available from Intel Corporation of Santa Clara, Calif., although other systems (including PCs having other microprocessors, engineering workstations, set-top boxes and the like) may also be used. In one embodiment, sample system 100 executes a version of the WINDOWS™ operating system available from Microsoft Corporation of Redmond, Wash., although other operating systems (UNIX and Linux for example), embedded software, and/or graphical user interfaces, may also be used. Thus, embodiments of the present invention are not limited to any specific combination of hardware circuitry and software.

The processor 110 includes one or more processor cores 140 to execute instructions of the system. The processor core 140 includes, but is not limited to, pre-fetch logic to fetch instructions, decode logic to decode the instructions, execution logic to execute instructions and the like. The processor 110 includes a cache 160 to cache instructions and/or data. The cache 160 includes, but is not limited to, level one, level two, and a last level cache (LLC) 165, or any other configuration of the cache memory within the processor 110. In another embodiment, the computing system 100 includes a component, such as a processor 110 to employ execution units including logic to perform algorithms for processing data, in accordance with the embodiment described herein.

The memory controller 130 performs functions that enable the processor 110 to access and communicate with a main memory 120 that includes a volatile memory and/or a non-volatile memory. In one embodiment, the memory controller 130 is coupled to a system agent 180 that includes an MEE 150. In one embodiment, the MEE 150 is located between the last level cache 165 and the memory controller 130 to perform encryption, decryption and authentication of the data lines moving in and out of a protected region 125 of the main memory 120. The MEE 150 is located on the processor die, while the memory 120 is located off the processor die.

According to one embodiment of the invention, the MEE 150 processes multiple memory read requests in parallel to improve the access latency to the protected region 125. The MEE 150 performs counter mode encryption which requires the encryption seed to be unique for a data line both temporally and spatially. Spatial uniqueness can be achieved by using the address of the data line to be accessed, while temporal uniqueness can be achieved by using a counter that serves as the version of the data line. In one embodiment, the MEE 150 also protects the data lines in the protected region 125 of the main memory 120 using a counter tree structure in which only the root of the tree is stored on-die and forms the root of trust (i.e., a trust boundary). The versions of the data lines are part of this counter tree structure. Alternatively, other protection mechanisms may be used for replay-protection. For example, Message Authentication Codes (MACs) associated with the secure cache lines can be stored on-die, since a successful replay attack would need to replay both the data line and its associated MAC. However, this solution has prohibitively high on-die storage requirements.

For the following description, the following terminology is used for the main memory 120: The main memory 120 is divided into regions, including one or more protected regions 125 (also referred to herein as secure memory range or MEE region). Each region has multiple sections, an EPC section, which is convertible at page granularity, a hardware reserved section of replay-protection and integrity metadata, which is convertible at section granularity, and another hardware reserved section which is internal to implementation and is not available for conversion. In one embodiment, the protected region (MEE region) may be a fixed range or multiple protected regions (MEE regions) may be a set of multiple fixed ranges. In another embodiment, the entire memory could be configured as flexible memory, divided into multiple MEE regions. At startup, the entire memory starts as non-secure and the system software converts it as guided by the demand for secure memory on the system. As described herein, the main memory 120 may include multiple secure MEE regions, and may also include non-secure memory ranges.

In one embodiment, the processor 110 includes one or more processor cores 140. The software (e.g., OS or VMM), executing on the processor core 140, can identify a convertible page in a memory range (labeled protected region 125) in main memory 120 and use a page conversion instruction to convert the convertible page. The processor core 140, in response to the page conversion instruction, determines from the page conversion instruction which convertible page in the protected region 125 to convert and converts the convertible page to be at least one of a secure page or a non-secure page. In one embodiment, the page conversion instruction is one of a first conversion instruction or a second conversion instruction. In response to the first conversion instruction, the processor core 140 converts the convertible page from a non-secure page to a secure page. In response to the second conversion instruction, the processor core 140 converts the convertible page from a secure page to a non-secure page. For example, during operation, the conversion of pages may be guided by the demand on the memory system at a particular time. If the OS/VMM determines that it is running low on non-secure memory, for example, due to a large number of enclaves running, and needs to allocate memory to a non-enclave application, the OS/VMM will determine pages that it wants to convert from secure to non-secure and carry out the process for converting as described herein. It should be noted that the description herein uses non-secure and non-secure interchangeably.

In one embodiment, the processor core 140 performs the following in response to the first conversion instruction to convert from non-secure to secure: 1) ensure that the address of the page, passed as a parameter to the instruction, points to a page that is convertible to a secure page; 2) verify that a secure bit of a page cache map entry (not illustrated) corresponding to the convertible page is set to be non-secure; 3) invalidate cached page contents from a cache 160 of the processor 110; 4) set the secure bit of the page cache map entry to be secure; and 5) invalidate a translation for the address for the processor core 140. It should be noted that in hyper-threaded processors with two threads, there are two logical processors. In this case, the translation that will be invalidated is for the address from a current logical processor. It should be noted that the following description indicates that the translation for the processor core could be for a translation of the address for a current logical processor.

In one embodiment, the processor core 140 performs the following in response to the second instruction to convert from secure to non-secure: 1) ensure that the address of the page, passed as a parameter to the instruction, points to a page that is convertible to a non-secure page; 2) verify that a secure bit of a page cache map entry corresponding to the convertible page is set to be secure; 3) verify that a valid bit of the page cache map entry is set to invalid, where the valid bit indicates whether the page is currently mapped to an enclave or not; 4) invalidate cached page contents from a cache of the processor; 5) set the secure bit of the page cache map entry to be non-secure; and invalidate a translation for the address for the processor core.

In a further embodiment, the secure memory range (protected region 125) further includes a second section, referred to herein as a hardware reserved section. The hardware reserved section is a convertible section. The main memory 130 may also include another hardware reserved section that is not convertible. The processor core 140, in response to a section conversion instruction, is configured to convert the hardware reserved section to be at least one of a secure section or a non-secure section. In one embodiment, the section conversion instruction is one of a third conversion instruction or a fourth conversion instruction. In response to the third conversion instruction to convert from non-secure to secure, the processor core 140 converts the hardware reserved section from a non-secure section to a secure section. In response to the fourth conversion instruction to convert from secure to non-secure, the processor core 140 converts the hardware reserved section from a secure section to a non-secure section. The hardware reserved section, when converted to secure, stores replay-protection and integrity metadata for that secure memory range (i.e., the particular MEE region). The software (OS/VMM) is responsible for deciding on the region for conversion. Once the decision is made, the OS/VMM executes the section conversion instruction to convert the section to non-secure or secure. The processor core 140 requires the address of any page in the section for conversion.

In one embodiment, the processor core 140 performs the following in response to the third instruction to convert a hardware reserved section from non-secure to secure: 1) ensure that the address of the page, passed as a parameter to the instruction, points to a page in the hardware reserved section; 2) ensure that the hardware reserved section is set as convertible, currently non-secure; 3) instruct the MEE to install a replay-protection filter for the hardware reserved section; and 4) instruct the MEE to put the hardware reserved section in an initialized state. It should be noted that the replay-protection filter (e.g., replay-protection tree filter) is different from the replay-protection mechanisms. For example, the replay-protection tree includes metadata that is used for providing integrity and replay-protection. As part of its operation, the MEE caches this metadata in its internal cache. However, when the same section was used as a non-secure section, just like any other data on the system, the data from this section can be cached in processor caches. Now on conversion, ideally the non-secure data cached in processor caches should be invalidated. However, since the replay-protection section consists of multiple pages, it becomes very inefficient to flush the contents of all the pages from the processor caches. Hence, the replay-protection filter, which is a hardware filter, can be installed at the MEE. The replay-protection filter is activated on converting a replay-protection section from non-secure to secure and de-activated on conversion back to non-secure. When activated, the replay-protection filter can drop any writebacks from the processor caches to the section for which it has been installed, thereby ensuring that the section data, now being used for storing replay-protection metadata, does not get corrupted.

In one embodiment, the processor core 140 performs the following in response to the fourth instruction to convert a hardware reserved section from secure to non-secure: 1) ensure that an address of the page, passed as a parameter to the instruction, points to a page in the hardware reserved section; 2) ensure that all the pages of the EPC section corresponding to the hardware reserved section being converted are in a non-secure state; 3) instruct the MEE to uninstall the replay-protection filter for the hardware reserved section; and 4) instruct the MEE to flush contents of the hardware reserved section (e.g., replay-protection section) from its internal cache. The flushing of contents from the MEE internal cache ensures that the eviction of contents will not corrupt the section when it is being used as a non-secure section.

It should be noted that the main memory 120 may include multiple secure memory ranges (referred to herein as MEE regions). The main memory 120 can also include non-secure memory ranges. An embodiment of a flexible protected range of the memory 120, including multiple MEE regions and non-secure memory ranges, is described below in detail with reference to FIG. 2.

Embodiments are not limited to computer systems. Alternative embodiments of the present invention can be used in other devices such as handheld devices and embedded applications. Some examples of handheld devices include cellular phones, Internet Protocol devices, digital cameras, personal digital assistants (PDAs), and handheld PCs. Embedded applications can include a micro controller, a digital signal processor (DSP), system on a chip, network computers (NetPC), set-top boxes, network hubs, wide area network (WAN) switches, or any other system that can perform one or more instructions in accordance with at least one embodiment.

One embodiment may be described in the context of a single processor desktop or server system, but alternative embodiments may be included in a multiprocessor system. System 100 may be an example of a 'hub' system architecture. The computer system 100 includes a processor 110 to process data signals. The processor 110, as one illustrative example, includes a complex instruction set computer (CISC) microprocessor, a reduced instruction set computing (RISC) microprocessor, a very long instruction word (VLIW) microprocessor, a processor implementing a combination of instruction sets, or any other processor device, such as a digital signal processor, for example. The processor 110 is coupled to a processor bus that transmits data signals between the processor 110 and other components in the system 100, such as memory 120 storing instruction, data, or any combination thereof. The other components of the system 100 may include a graphics accelerator, a memory controller hub, an I/O controller hub, a wireless transceiver, a Flash BIOS, a network controller, an audio controller, a serial expansion port, an I/O controller, etc. These elements perform their conventional functions that are well known to those familiar with the art.

In one embodiment, the processor 110 includes a Level 1 (L1) internal cache memory 160. Depending on the architecture, the processor 110 may have a single internal cache or multiple levels of internal caches. Other embodiments include a combination of both internal and external caches depending on the particular implementation and needs. A register file is to store different types of data in various registers including integer registers, floating point registers, vector registers, banked registers, shadow registers, checkpoint registers, status registers, configuration registers, and instruction pointer register.

It should be noted that the execution unit may or may not have a floating point unit. The processor 110, in one embodiment, includes a microcode (ucode) ROM to store microcode, which when executed, is to perform algorithms for certain macroinstructions or handle complex scenarios. Here, microcode is potentially updateable to handle logic bugs/fixes for processor 110.

Alternate embodiments of an execution unit may also be used in micro controllers, embedded processors, graphics devices, DSPs, and other types of logic circuits. System 100 includes a memory 120. Memory 120 includes a dynamic random access memory (DRAM) device, a static random access memory (SRAM) device, flash memory device, or other memory device. Memory 120 stores instructions and/or data represented by data signals that are to be executed by the processor 110. The processor 110 is coupled to the memory 120 via a processor bus. A system logic chip, such as a memory controller hub (MCH) may be coupled to the processor bus and memory 120. An MCH can provide a high bandwidth memory path to memory 120 for instruction and data storage and for storage of graphics commands, data and textures. The MCH can be used to direct data signals between the processor 110, memory 120, and other components in the system 100 and to bridge the data signals between processor bus, memory 120, and system I/O, for example. The MCH may be coupled to memory 120 through a memory interface. In some embodiments, the system logic chip can provide a graphics port for coupling to a graphics controller through an Accelerated Graphics Port (AGP) interconnect. The system 100 may also include an I/O controller hub (ICH). The ICH can provide direct connections to some I/O devices via a local I/O bus. The local I/O bus is a high-speed I/O bus for connecting peripherals to the memory 120, chipset, and processor 110. Some examples are the audio controller, firmware hub (flash BIOS), wireless transceiver, data storage, legacy I/O controller containing user input and keyboard interfaces, a serial expansion port such as Universal Serial Bus (USB), and a network controller. The data storage device can comprise a hard disk drive, a floppy disk drive, a CD-ROM device, a flash memory device, or other mass storage device.

For another embodiment of a system, the instructions executed by the processor core 140 described above can be used with a system on a chip. One embodiment of a system on a chip comprises of a processor and a memory. The memory for one such system is a flash memory. The flash memory can be located on the same die as the processor and other system components. Additionally, other logic blocks such as a memory controller or graphics controller can also be located on a system on a chip.

Figure 2:
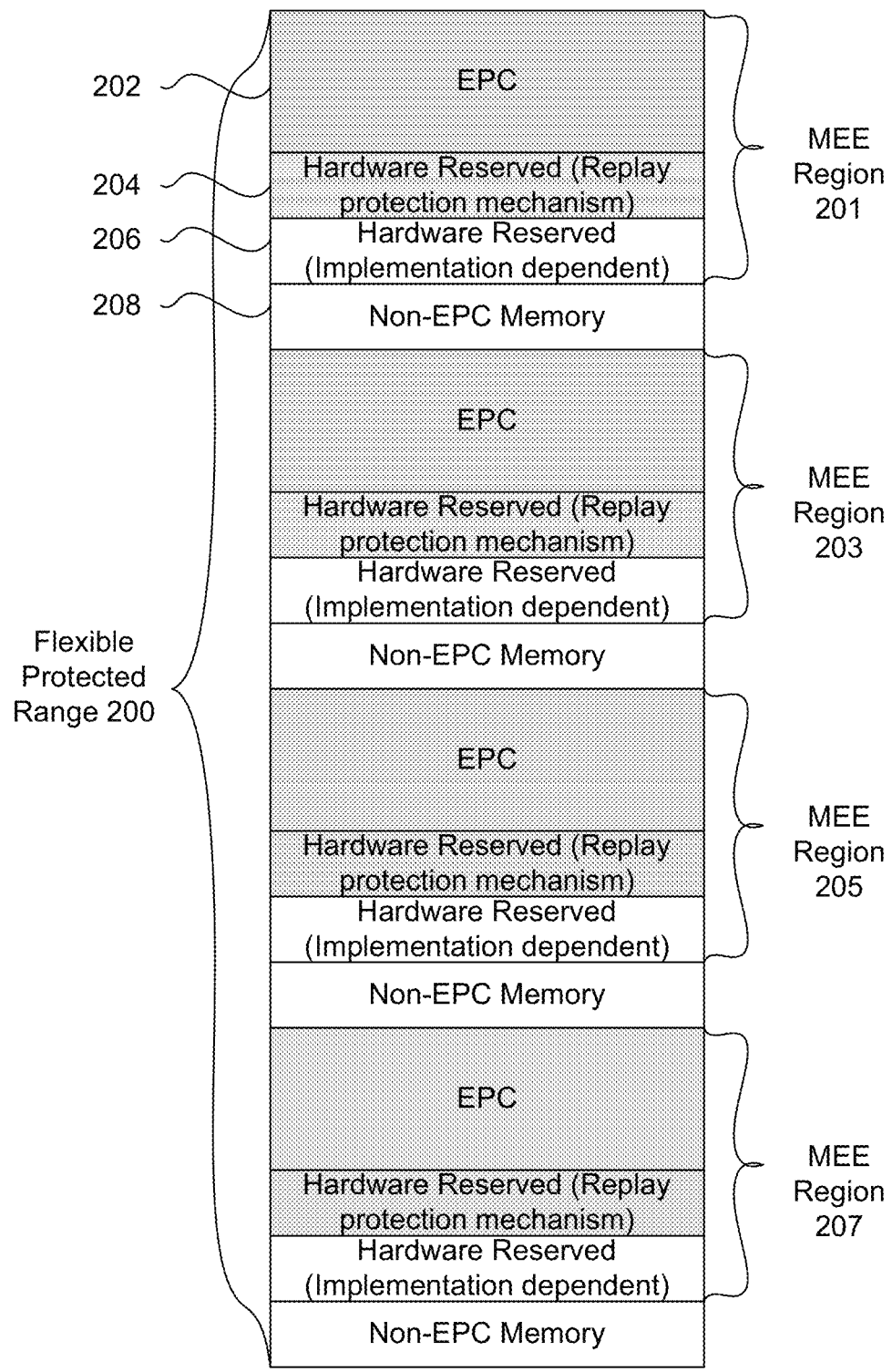
FIG. 2 illustrates a conceptual layer of a flexible protected range 200 including multiple memory ranges according to one embodiment.

FIG. 2 illustrates a conceptual layer of a flexible protected range 200 including multiple secure memory ranges according to one embodiment. A central processing unit (CPU) that supports secure memory repartitioning of secure enclaves permits BIOS (not illustrated) to reserve a range of memory called Processor Reserved Memory (PRM). The PRM can be organized into multiple secure memory ranges 201-207, labeled MEE regions. Each of secure memory regions 201-207 each includes three sections 202, 204, 206. The first section 202, labeled EPC, includes convertible pages (e.g., used for enclave pages). The second section 204, labeled Hardware Reserved (replay-protection mechanism), is a convertible section that can be used for storing replay-protection and integrity metadata for the particular secure memory range (MEE region) when configured as a secure section, but can be converted for non-secure use, as described herein. This section is also referred to herein as the replay-protection section. The third section 206, labeled Hardware Reserved (Implementation mechanism) can be used for storing information for the hardware for internal bookkeeping and specific implementations. The flexible protected range 200 may also include non-secure memory 208, labeled non-EPC memory. This memory is always set to be non-secure and can never be used as EPC 202.

As described herein, the flexible EPC allows dynamic repartitioning of the EPC 202 by providing an OS with conversion instructions to move EPC memory between secure and non-secure memory.

In another embodiment, each MEE region (e.g., 201-207) consists of two sections: the EPC section 202 and hardware-reserved section, which can be further divided into two sub-sections 204, 206. The sub-section 204 is subsequently referred to as replay-protection section 204. The EPC section 202 is used as EPC memory for secure code (e.g., enclave code) and secure data (e.g., enclave data) and the corresponding hardware-reserved section 204 is used to store cryptographic metadata for the replay protection mechanism implementation by the MEE 150. The replay-protection mechanism provides integrity and replay-protection for the EPC section 202. The sub-section 206 of memory is reserved by hardware for internal bookkeeping and implementation. From MEE perspective, each MEE region is self-contained. In essence, to satisfy EPC requests from a MEE region 201, MEE 150 only needs to access the replay-protection section 204 located in that particular MEE region 201.

In one implementation, with flexible-EPC with convertible pages and sections as described herein, the entire flexible protected range 200 can be setup as non-secure memory on startup. The MEE regions 201-207 can be enumerated using an instruction EENUM. EENUM may be considered a leaf function of a secure enclave instruction. As described herein, the memory inside EPC section 202 and hardware-reserved section 204 can be converted from non-secure to secure, and vice-versa. However, the flexible-EPC architecture may impose certain restrictions on memory conversion as described below.

The demand for secure memory on a system is strongly correlated to the type of workloads running on the system which can change with time. In order to allow the OS to dynamically re-partition the EPC 202 between secure and non-secure (or regular) usages, a set of instructions are provided to the OS to facilitate the conversion. As noted above, the entire flexible protected range 200 is not convertible as illustrated in FIG. 3.

Figure 3:
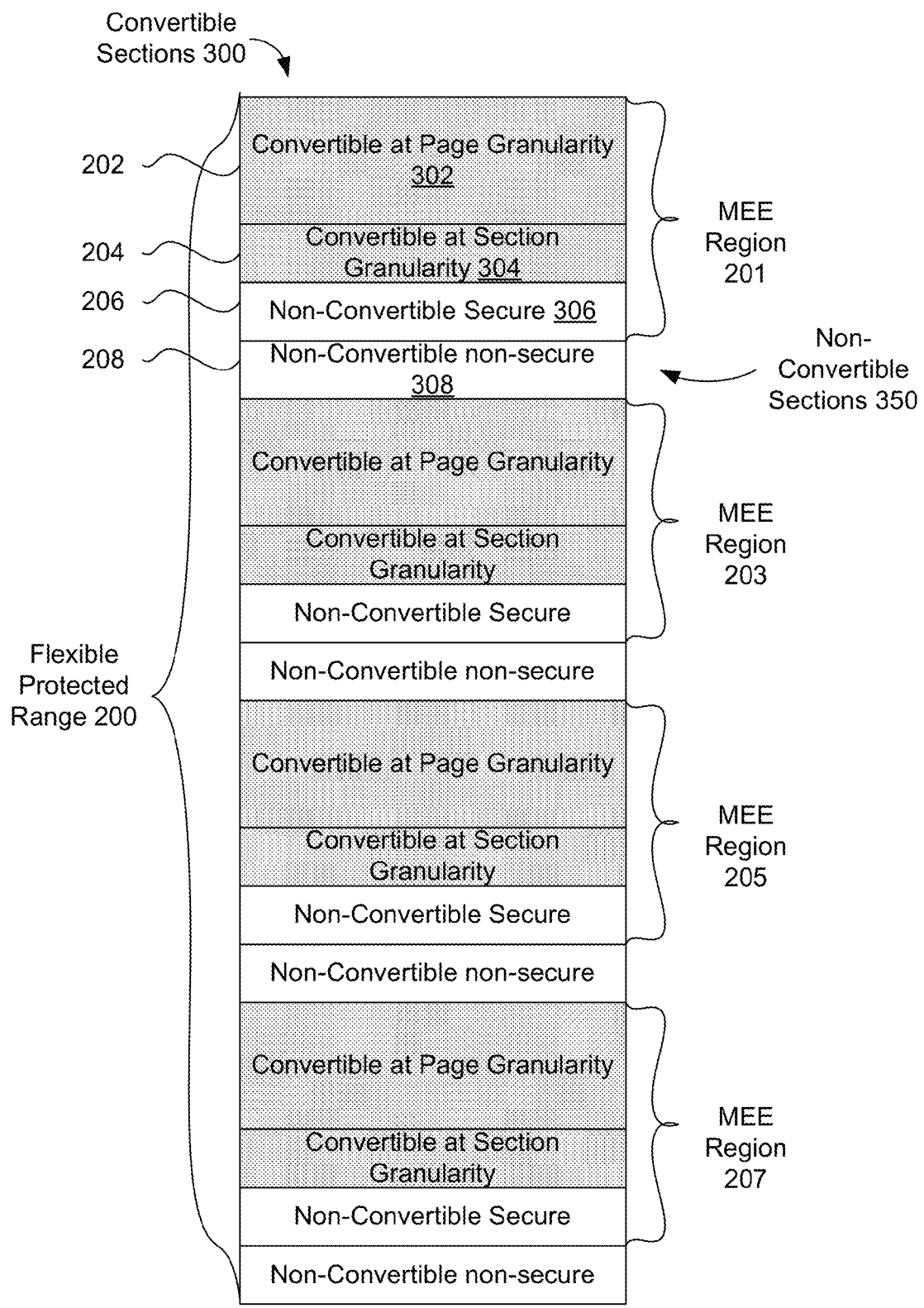
FIG. 3 illustrates convertible sections of memory and non-convertible sections of memory in a flexible protected range according to one embodiment.

FIG. 3 illustrates convertible sections 300 of memory and non-convertible sections 350 of memory in a flexible protected range 200 according to one embodiment. Within an MEE region 201, the EPC section 202 is convertible at page granularity 302 and replay-protection section 204 is convertible at section granularity 304. To permit conversion in the flexible protected range 200, two instructions, EMKSEC and EMKREG for page granular conversion 302 of the EPC section 202 are used and two instructions, ERPTSEC and ERPTREG, for section granular conversion 304 of the replay-protection section 204. In one embodiment, EMKSEC instruction is used by the OS to convert a non-secure page in the EPC section 202 to a secure page and EMKREG instruction is used to convert a secure page in the EPC section 202 to a non-secure page. In a further embodiment, ERPTSEC is used by the OS to convert a replay-protection section 204 from regular to secure and ERPTREG is used by the OS to convert a replay-protection section 204 from secure to non-secure. The replay-protection section is convertible at section granularity. Hence, at a particular time, the replay-protection section is either secure or non-secure in its entirety.

In one embodiment, the SE architecture uses a page cache map, called enclave Page Cache Map (EPCM), which is used to track security attributes of a page in the EPC section 202. The SE architecture extends the EPCM to indicate a current status of each of the convertible pages in the EPC section 202. A secure bit is added to the EPCM which when set for a particular EPCM entry indicates that the corresponding page is currently secure. The EMKSEC and EMKREG instructions toggle this bit appropriately. For the replay-protection section 204, since it can be secure or non-secure in its entirety, the secure bit in the EPCM for the individual pages has no meaning. The hardware internals tracks the status of the section and in order for the software (OS/VMM) to know the current status, the EENUM instruction is provided which indicates whether a particular replay section is currently non-secure or secure.

In a further embodiment, the flexible protected range 200 can also include non-convertible sections 350, including non-convertible secure 306 and non-convertible, non-secure 308. For example, the hardware-reserved section 206 inside each MEE region 201 may always be considered secure, and not visible to software, i.e., non-convertible secure 306. The section 206 can be used for internal bookkeeping. The memory outside the MEE region 201, namely hardware-reserved section 208, is always maintained as non-secure memory and cannot be converted to secure, i.e., non-convertible, non-secure 208.

Figures 4A, 4B:
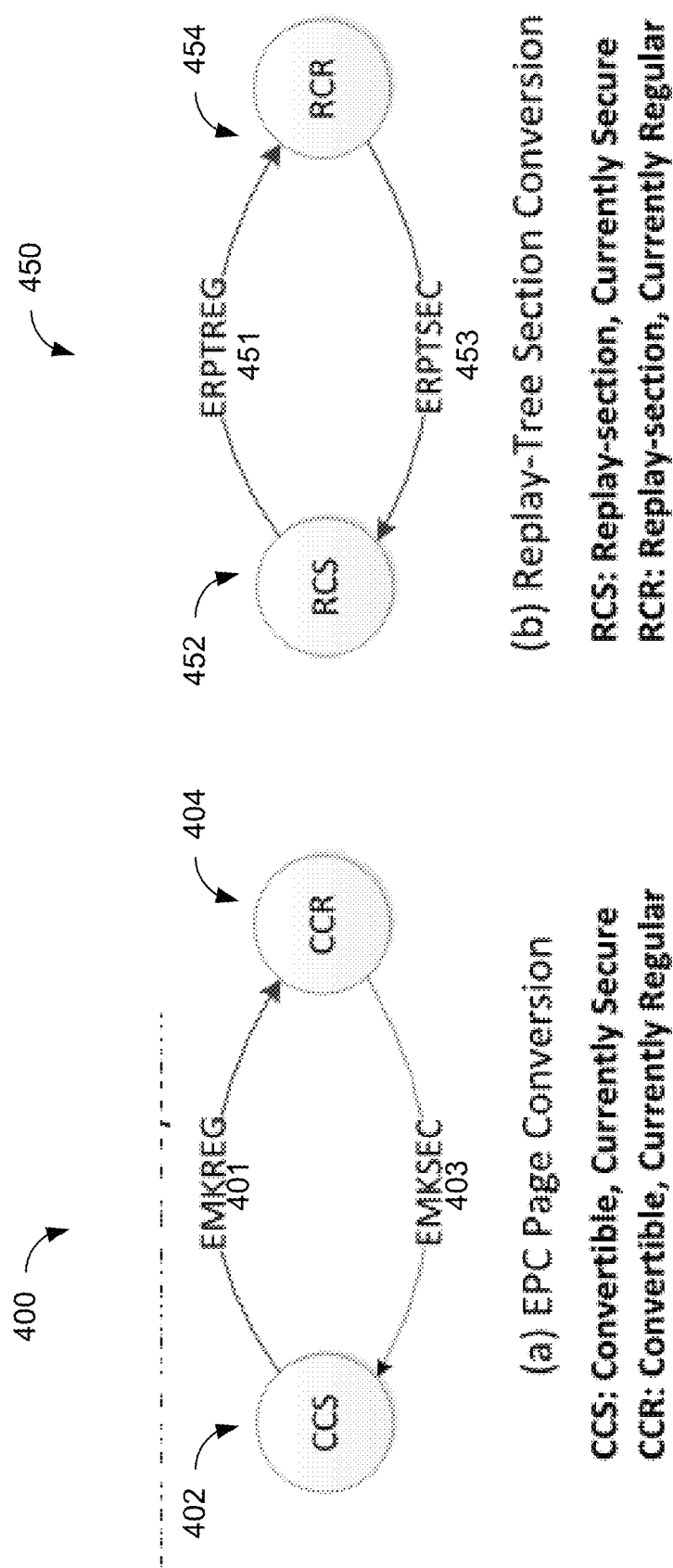
FIG. 4A is a state diagram illustrating state transitions of a convertible page of a flexible protection range according to one embodiment.
FIG. 4B is a state diagram illustrating state transitions of a convertible section of a flexible protection range according to one embodiment.

FIG. 4A is a state diagram 400 illustrating memory state transitions of a convertible page of a flexible protection range according to one embodiment. In this embodiment, there are two states: a first state 402 in which a page is convertible and currently secure (labeled "Convertible, Currently Secure" or "CCS") and a second state 404 in which the page is convertible and currently non-secure (labeled Convertible, Currently Regular" or "CCR", where regular is used interchangeably with non-secure). In this embodiment, the page's status is toggled between the two states 402, 404 using the two instructions EMKREG 401 and EMKSEC 403. When EMKREG 401 is executed, the page's status transitions from the first state 402 to the second state 404. When EMKSEC 403 is executed, the page's status transitions from the second state 404 to the first state 402.

FIG. 4B is a state diagram 450 illustrating memory state transitions of a convertible section of a flexible protection range according to one embodiment. In this embodiment, there are two states: a first state 452 in which a section is convertible and currently secure (labeled "Replay-section, Currently Secure" or "RCS") and a second state 404 in which the section is convertible and currently non-secure "Replay-section, Currently Regular" or "RCR"). In this embodiment, the section's status is toggled between the two states 452, 454 using the two instructions ERPTREG 451 and ERPTSEC 453. When ERPTREG 451 is executed, the section's status transitions from the first state 452 to the second state 454. When ERPTSEC 453 is executed, the section's status transitions from the second state 454 to the first state 452.

While the EPC section 202 and replay-protection section 204 are both convertible, the architecture imposes restrictions on conversion of EPC pages and replay-protection sections through the conversion instructions. The restrictions on conversion are as follows: Restriction 1: If any data page in an MEE region is currently secure, then the replay-protection section in that region must be secure; and Restriction 2: If replay-protection section is non-secure, then all EPC pages in the EPC section 202 in that region must also be non-secure.

The restrictions enforced by the architecture ensure that the EPC pages are always cryptographically protected by the replay-protection mechanism. The flexible EPC architecture, in addition to providing the conversion instructions, also provides an additional instruction, EENUM. EENUM instruction can be used by system software to enumerate the MEE regions on the platform and also enumerate the restrictions on conversion. In particular, EENUM can be used by system software to obtain the following information about an MEE region: 1. Base address of the EPC and replay-protection sections in the region; 2. Size of each of the sections; and 3. Section status to indicate the convertibility of a section: a) Indication whether a section can currently be converted to non-secure or secure b) Indication whether a section can ever be converted to non-secure or secure. In addition to providing this information, the EENUM instruction can also be used by system software to obtain the total number of MEE regions on the system.

Embodiments of the conversion process for EPC pages and replay-protection section are described in more detail below.

Converting a Non-secure Page to Secure:

In one embodiment, the OS can convert a non-secure page to secure using the following procedure:

1. OS removes user mapping for the page to be converted
2. OS performs necessary translation lookaside buffer (TLB) invalidations by issuing inter-processor interrupts (IPIs). This ensures that there are no state TLB mappings to the page when it was being used as non-secure.

3. OS executes EMKSEC on the selected page. EMKSEC can take the linear address of the page to be converted as a parameter.

On successful execution of EMKSEC, the target page is converted to secure, for example, by setting a secure bit in the EPCM. OS can now create new mapping for this page for enclave use.

In other embodiments, more or less operations can be used for converting a non-secure page to secure.

Converting a Secure Page to Non-Secure:

In one embodiment, the OS can convert a secure page to non-secure using the following procedure:

1. OS removes user mapping for the page to be converted

2. OS performs necessary TLB invalidation by issuing IPIs. This ensures that there are no stale TLB mappings to the page when it was being used as secure.

3. OS executes EMKREG on the selected page. EMKREG takes the linear address of the page to be converted as a parameter.

On successful execution of EMKREG, the target page is converted to non-secure, for example by clearing the secure bit in the EPCM. OS can now create new mapping for this page for non-secure (e.g., non-enclave) use.

In other embodiments, more or less operations can be used for converting a secure page to non-secure.

Converting a Replay-Protection Section from Non-Secure to Secure:

In one embodiment, the OS ensures that the replay-protection section of an MEE region is secure before allocating a page from the EPC section for enclave use (Restriction 1). This is required by the architecture before any pages from the corresponding EPC section can be converted to secure and allocated for enclave use. The OS can convert replay-protection section from non-secure to secure using the following procedure:

1. If any pages in the replay-protection mechanism are being used as non-secure, OS needs to write them out.

2. OS must not allocate any pages from this section to satisfy new non-enclave page requests.

3. OS executes ERPTSEC on the selected section. ERPTSEC takes the linear address (e.g., 4K-aligned linear address) of a page in the replay-protection section as a parameter. Executing ERPTSEC on any page in the replay-protection section transitions the state of the entire section from non-secure to secure.

On successful execution of ERPTSEC, the target replay-protection section is converted to secure. OS can now allocate pages from the corresponding EPC section for secure use.

In other embodiments, more or less operations can be used for converting a replay-protection section from non-secure to secure.

Converting a Replay-Protection Section from Secure to Non-Secure:

In one embodiment, the OS can convert a replay-protection section in an MEE region from secure to non-secure using the following procedure:

1. Make sure that all pages in the EPC section of the MEE region are non-secure (Restriction 2); a) If any pages being used inside enclave, OS needs to write them out using SE mechanism for writing back secure pages, where the SE architecture provides the instruction to do this; and b) OS should not allocate any pages from this EPC section 202 to satisfy new requests from enclaves.

2. OS executes ERPTREG on the selected section. ERPTREG takes a linear address (e.g., 4K-aligned linear address) of a page in the replay-protection section as a parameter. Executing ERPTREG on any page in the replay-protection section transitions the state of the entire section from secure to non-secure.

On successful execution of ERPTREG, the target replay-protection section is converted to non-secure. OS can now allocate the pages in this section for non-secure use.

In other embodiments, more or less operations can be used for converting a replay-protection section from secure to non-secure.

It should be noted that the embodiments described herein can be used in virtualized environments as well.

Virtualizing Flexible-EPC:

A virtual machine monitor (VMM), also referred to as a hypervisor, needs to be able to ensure that a lower privileged entity (e.g., malicious or misbehaving guest OS) cannot cause instability for the VMM. Incorrect TLB management on page conversion can result in system instability. As an example, on converting a page from non-secure to secure, if the OS does not remove the stale TLB mapping for the non-secure page, this stale TLB mapping can be used to load data from memory. This data can subsequently be modified when resident in the cache which on eviction corrupts the secure memory resulting in system instability (MEE causes integrity failure). Hence, VMM must ensure correct TLB management on page conversion to prevent guest OS from causing system instability. Flexible-EPC supports three modes or virtualization: Disabled Mode, Guest-Transparent Mode, and Guest-Visible Mode. In disabled mode, the VMM does not enable Flexible-EPC. In guest-transparent mode, the VMM uses flexible-EPC to expose legacy EPC to the guest OS. In guest-visible mode, VMM exposes flexible-EPC to the guest OS. The embodiments described below are example processes that can be performed, but in other embodiments, more or less operations than those described can be used in the different virtualization modes.

Disabled Mode:

In disabled mode, the VMM is either not aware of flexible-EPC or does not want to use it. VMM hides flexible-EPC from the guest OS. In one embodiment, the flexible-EPC feature presence can be enumerated through the instruction, CPUID (CPU Identifier). For these systems, the VMM hides the presence of flexible-EPC by virtualizing CPUID instruction. In addition, the VMM prevents the guest OS from executing the flexible-EPC instructions as described herein. This is done by clearing a new secondary processor-based control, for example, ENABLE_FLEXEPC control. Any attempt by the guest OS to execute the flexible-EPC instructions with ENABLE_FLEXEPC cleared results in an undefined opcode error, #UD, which occurs when the instruction opcode is not defined.

Guest-Transparent Mode:

In guest-transparent mode, the VMM uses flexible-EPC but does not expose it to the guest. The VMM uses flexible-EPC to expose legacy static EPC to the guest. Similar to the disabled mode, the VMM hides flexible-EPC functionality by virtualizing CPUID and prevents the guest from executing flexible-EPC instructions by clearing ENABLE_FLEXEPC control. In addition, the VMM virtualizes read requests to traditional static EPC range registers and CPUID.SE_LEAF (similar to EENUM) to enumerate virtual EPC to the guest OS. The VMM uses tables (e.g., EPTs) to map the guest EPC to secure pages in flexible-EPC managed by the VMM. VMM uses flexible-EPC instructions, for example, EMKREG, EMKSEC, ERPTREG, ERPTSEC, to manage the demand for secure and non-secure pages across multiple guest OSs. The conversion flows used by the VMM in guest-transparent mode are similar to the native-OS flows.

Guest-Visible Mode:

In guest-visible mode, the VMM exposes flexible-EPC to the guest through CPUID and allows the guest to execute flexible-EPC instructions by setting ENABLE_FLEXEPC control to 1. The following description is directed to embodiments of conversion of convertible pages and convertible sections in virtualization environments.

Virtualizing Secure-to-Non-secure Conversion:

The EMKREG instruction used for converting a secure to non-secure page ensures that the operation is allowed only when the page is marked as not valid in the EPCM. This ensures that there are no stale TLB entries for the page, i.e., there are no TLB entries that were cached when the page was being used as secure. This is ensured by the SE architecture. When an enclave page is unmapped from the enclave, its TLB entries are invalidated as keeping the TLB entries poses a security threat. Hence, for this direction on conversion, the hardware ensures correct TLB management and the guest cannot cause instability for the VMM. Hence, VMM does not need to do any additional operations when a guest converts a secure page to non-secure.

Virtualizing Non-Secure-to-Secure Conversion:

For this direction of conversion, the software must flush the stale TLB entries, i.e., entries that were cached when the page was being used as non-secure. Consequently, a misbehaving or malicious OS can cause instability for the VMM by converting a non-secure page to secure using EMKSEC instruction without flushing the stale TLB entries. Hence, in order to ensure system stability, the VMM can ensure that the TLB is flushed on conversion of a non-secure page to secure on the guest OS. The following shows the sequence of operations performed by the VMM to virtualize conversion to a secure page:

1) VMM hooks into EMKSEC instruction to receive a VMExit on execution of EMKSEC instruction on the guest.

2) On execution of EMKSEC on the guest, the VMM receives a VMExit;

3) VMM unmaps the page from EPTs;

4) VMM invalidates TLBs on all CPUs where the guest ever executed on;

5) VMM executes EMKSEC instruction on behalf of the guest to convert the page to secure; and 6) VMM maps the page back in the EPTs and resumes the guest.

In other embodiments, other operations may be performed for the page conversions. The VMM does not need to do anything for the section conversion operations as the section conversion instructions ensure system stability using the hardware filter.

The following description provides a summary of the instruction set architecture (ISA) for flexible-EPC, as described herein.

EMKSEC:

Purpose: EMKSEC is provided to the OS to convert a page from non-secure to secure.

Parameters: RCX register in data segment (DS:RCX): Logical address of a page to be converted.

Operations:

1) Ensure that the address points to a page that is convertible to a secure page;

2) Verify that EPCM.S=0;

3) (WB) Invalidate cached page contents from cache hierarchy;

4) Set EPCM.S=1;

5) Invalidate the translation for DS:RCX from the current LP;

EMKREG:

Purpose: EMKREG is provided to the OS to convert a page from secure to non-secure;

Parameters: DS:RCX: Logical address of a page to be converted;

Operations:

1) Ensure that the address points to a page that is convertible to a non-secure page;

2) Verify that EPCM.S=1;

3) Verify that EPCM.V=0;

4) (WB) Invalidate the page contents from the cache hierarchy;

5) Set EPCM.S=0;

6) Invalidate the translation for DS:RCX from the current LP;

EMKRPTSEC:

Purpose: EMKRPTSEC is provided to the OS to convert a replay-protection section from non-secure to secure.

Parameters: DS:RCX: Logical address of a page in the replay-protection section to be converted.

Operations:

1) Ensure that the address points to an a replay-protection page (e.g., replay-protection tree (RPTree) page);

2) Instruct MEE on the system to install a replay-protection filter. The replay-protection filter is installed at the MEE to ensure that the replay-protection section data cached when the replay-protection section as used as non-secure by the OS does not evict and cause corruption of the replay-protection. The filter ensures the system stability without having to flush all pages in the replay-protection section from processor caches.

3) Instruct MEE to put the replay-protection section in its initial state, e.g., the convertible, concurrently non-secure state.

EMKRPTREG:

Purpose: EMKRPTSEC is provided to the OS to convert a replay-protection section from secure to non-secure.

Parameters: DS:RCX: Logical address of a page in the replay-protection section to be converted.

Operation:

1) Ensure that the address points to an replay-protection section page, and that all data pages corresponding to this replay-protection section are in convertible, currently non-secure state;

2) Instruct MEE on the system to uninstall the replay-protection protection filter for this replay-protection section; and 3) Instruct MEE on the system to flush the contents of the replay-protection mechanism from the replay-protection section from their caches.

EEENUM:

Purpose: EEENUM is provided to the OS to enumerate the MEE regions on the platform. It can also enumerate the details for one section inside the MEE region as guided by the input parameter.

Parameter: ECX: Region ID and Section ID combination

Operations:

1) If region/Section ID is not valid, return the maximum region/section ID supported on the platform;

2) If region/Section ID is valid, the following information is returned: a) Base address of the section b) Number of pages (e.g., 4K pages) in the section; and 3) Status bits to indicate whether the section (or pages from) this section can currently be converted to non-secure or secure.

Figure 5A:
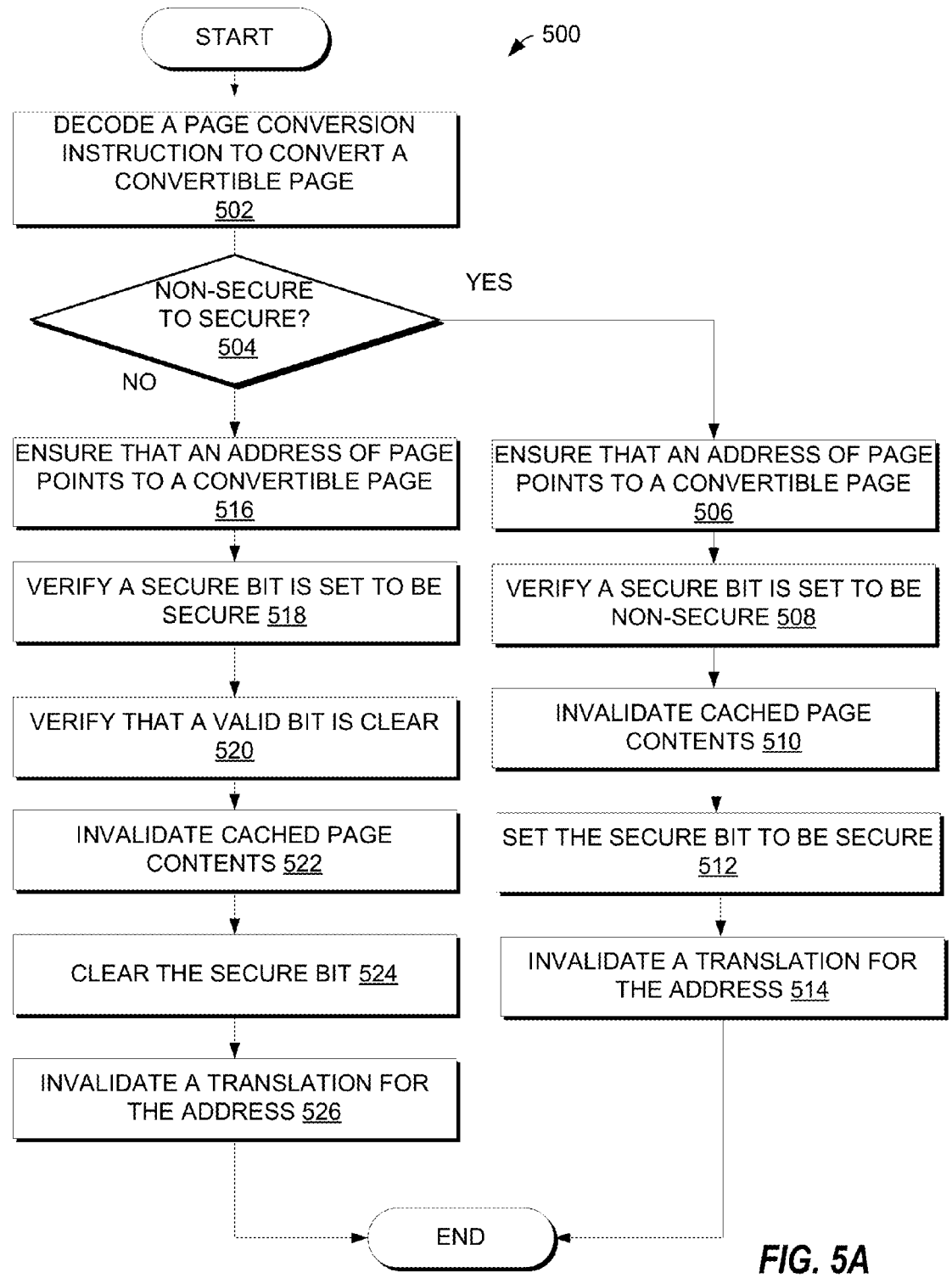
FIG. 5A is a flow diagram of a method of secure memory repartitioning of a convertible page according to one embodiment.

FIG. 5A is a flow diagram of a method 500 of secure memory repartitioning of a convertible page according to one embodiment. Method 500 may be performed by processing logic that may comprise hardware (e.g., circuitry, dedicated logic, programmable logic, microcode, etc.), software (such as operations being performed by the MCU), firmware or a combination thereof. In one embodiment, method 500 is performed by processor 110 of FIG. 1. In another embodiment, the method 500 is performed by any of the processors described with respect to FIGS. 6a-12. Alternatively, other components of the computing system 100 (or software executing on the processor 110) may perform some or all of the operations of the method 500.

Referring to FIG. 5A, the method 500 begins by the processing logic with decoding a page conversion instruction to convert a convertible page in main memory coupled to the processor core (block 502). The processing logic determines from the instruction whether the convertible page is to be converted from a secure page to a non-secure page or from a non-secure page to a secure page (block 504). The OS/VMM decides which page to convert from non-secure to secure or secure to non-secure, and the processing logic decodes the instruction to determine whether the page is to be converted from non-secure to secure or from secure to non-secure. In one embodiment, the processing logic makes this determination when decoding one of the two page conversion instructions, as described herein. The instruction can identify an address of the page to be converted. It should also be noted that although depicted as two separate blocks, blocks 502 and 504 can be performed together as part of decoding the instruction.

When the page is to be converted to secure from non-secure, the processing logic ensures that an address of the page points to a convertible page (block 506) and verifies a secure bit is set to be non-secure (block 508). The secure bit may be a bit in a page cache map entry that corresponds to the convertible page. When the security bit is set, the page is secure and, when the security bit is cleared, the page is non-secure. The processing logic invalidates any cached page contents in a cache corresponding to the convertible page (block 510). The processing logic sets the secure bit to be secure (block 512) and invalidates a translation for the address for the processor core (block 514); and the method 500 ends. If at block 504, the conversion is from secure to non-secure, the processing logic ensures that an address of the page points to a convertible page (block 516) and verifies a secure bit is set to be secure (block 518). The processing logic verifies that a valid bit (block 520) is invalid (i.e., valid bit clear). The valid bit may also be a bit of the page cache map. The processing logic invalidates any cached page contents in the cache (block 522), clears the secure bit to be non-secure (block 524) and invalidates a translation for the address for the processor core (block 526); and the method 500 ends.

In another embodiment, the processing logic identifies a convertible page in a memory range in main memory coupled to one or more processors in response to a page conversion instruction. The secure memory range includes a first section of convertible pages that can be converted to secure pages or non-secure pages. The processing logic converts the convertible page to be at least one of a secure page or a non-secure page. The processing logic can be instructed directly by the OS/VMM to convert a particular page or section passed as a parameter to the instruction leaf as described herein. In one embodiment, the processing logic converts the convertible page from a non-secure page to a secure page when the page conversion instruction is a first conversion instruction, and converts the convertible page from the secure page to the non-secure page when the page conversion instruction is a second conversion instruction.

In one embodiment, in response to the first conversion instruction, the processing logic ensures that an address of the convertible page points to a page that is convertible to a secure page. The processing logic verifies that a secure bit of a page cache map entry corresponding to the convertible page is set to be non-secure and invalidates cached page contents from a cache of the processor. The processing logic sets the secure bit of the page cache map entry to be secure and invalidates a translation for the address for the processor core.

In one embodiment, in response to the second conversion instruction, the processing logic ensures that an address of the convertible page points to a page that is convertible to a non-secure page. The processing logic verifies that a secure bit of a page cache map entry corresponding to the convertible page is set to be secure. The processing logic verifies that a valid bit of the page cache map entry is set to invalid and invalidates cached page contents from a cache of the processor. The processing logic sets the secure bit of the page cache map entry to be non-secure and invalidates a translation for the address for the processor core.

Figure 5B:
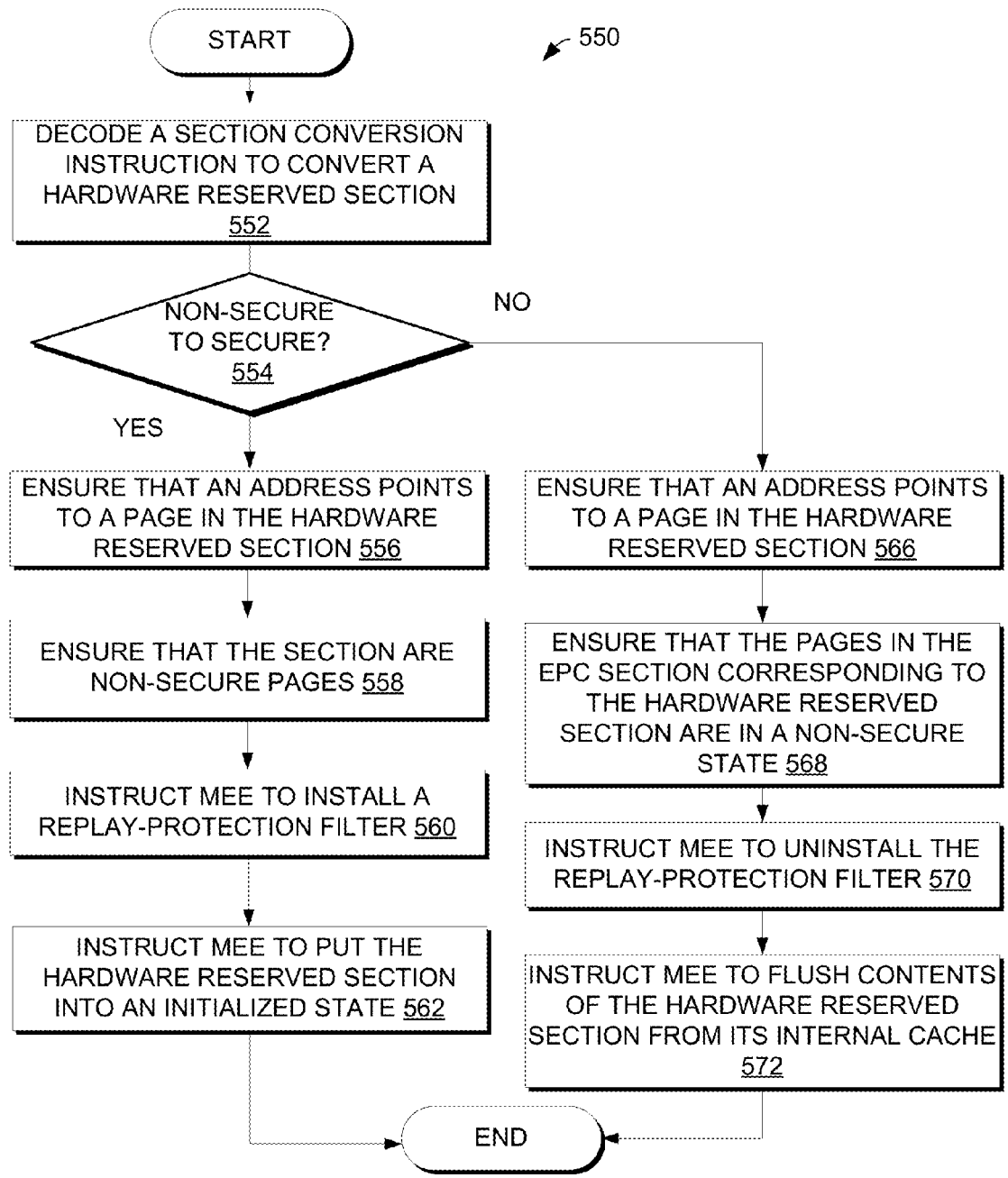
FIG. 5B is a flow diagram of a method of secure memory repartitioning of a convertible section according to one embodiment.

FIG. 5B is a flow diagram of a method 550 of secure memory repartitioning of a convertible section according to one embodiment. Method 550 may be performed by processing logic that may comprise hardware (e.g., circuitry, dedicated logic, programmable logic, microcode, etc.), software (such as operations being performed by the MCU), firmware or a combination thereof. In one embodiment, method 550 is performed by processor 110 of FIG. 1. In another embodiment, the method 550 is performed by any of the processors described with respect to FIGS. 6a-12. Alternatively, other components of the computing system 100 (or software executing on the processor 110) may perform some or all of the operations of the method 550.

Referring to FIG. 5B, the method 550 begins by the processing logic with decoding a section conversion instruction to convert the hardware reserved section in the memory range (block 552). The processing logic determines whether the hardware reserved section is to be converted from a non-secure section to a secure section or from a secure section to a non-secure section (block 554). The OS/VMM decides which section to convert from non-secure to secure or secure to non-secure, and the processing logic decodes the instruction to determine whether the section is to be converted from non-secure to secure or from secure to non-secure. In one embodiment, the processing logic makes this determination when decoding one of the two section conversion instructions, as described herein. It should also be noted that although depicted as two separate blocks, blocks 552 and 554 can be performed together as part of decoding the instruction.

When the section is to be converted from non-secure to secure at block 554, the processing logic ensures that an address of the instruction points to a page in the hardware reserved section (block 556). The processing logic ensures that the hardware reserved section is set as convertible, currently non-secure (block 558). The processing logic instructs the MEE to install a replay-protection filter (block 560) for the hardware reserved section (block 560). The processing logic instructs the MEE to put the hardware reserved section into an initialized state (block 562); and the method 550 ends.

When the section is to be converted from secure to non-secure at block 554, the processing logic ensures that an address of the instruction points to a page in the hardware reserved section (block 566). The processing logic ensures that pages in the EPC section corresponding to hardware reserved section are in a non-secure state (block 568). The processing logic instructs the MEE to uninstall the replay-protection filter for the hardware reserved section (block 570) and instructs the MEE to flush contents of the hardware reserved section from its internal cache (block 572); and the method 550 ends.

In another embodiment, the secure memory range includes a hardware reserved section. The processing logic decodes a section conversion instruction to convert the hardware reserved section in the secure memory range and executes the section conversion instruction to convert the hardware reserved section to be at least one of a secure section or a non-secure section. In a further embodiment, the processing logic converts the hardware reserved section from a non-secure section to a secure section when the section conversion instruction is a third conversion instruction and converts the hardware reserved section from the secure section to the non-secure section when the section conversion instruction is a fourth conversion instruction.

In a further embodiment, the processing logic, in response to the third conversion instruction to convert a hardware reserved section from non-secure to secure, ensure that an address of the third conversion instruction points to a page in the hardware reserved section. The processing logic ensure that the hardware reserved section of the memory range is set as convertible, currently non-secure and instructs the MEE to install a replay-protection filter for the hardware reserved section. The processing logic instructs the MEE to put the hardware reserved section in an initialized state.

In a further embodiment, the processing logic, in response to the fourth conversion instruction to convert a hardware reserved section from secure to non-secure, ensures that an address of the fourth conversion instruction points to a page in the hardware reserved section. The processing logic ensures that pages in the EPC section corresponding to the hardware reserved section are in a non-secure state. The processing logic instructs the MEE to uninstall the replay-protection filter for the hardware reserved section and instructs the MEE to flush contents of the hardware reserved section (e.g., replay-protection section) from its internal cache.

FIG. 6A is a block diagram illustrating a micro-architecture for a processor 600 that implements secure memory repartitioning according to one embodiment. Specifically, processor 600 depicts an in-order architecture core and a register renaming logic, out-of-order issue/execution logic to be included in a processor according to at least one embodiment of the disclosure. The embodiments of the converting pages and sections can be implemented in processor 600.

Processor 600 includes a front end unit 630 coupled to an execution engine unit 650, and both are coupled to a memory unit 670. The processor 600 may include a reduced instruction set computing (RISC) core, a complex instruction set computing (CISC) core, a very long instruction word (VLIW) core, or a hybrid or alternative core type. As yet another option, processor 600 may include a special-purpose core, such as, for example, a network or communication core, compression engine, graphics core, or the like. In one embodiment, processor 600 may be a multi-core processor or may be part of a multi-processor system.

The front end unit 630 includes a branch prediction unit 632 coupled to an instruction cache unit 634, which is coupled to an instruction translation lookaside buffer (TLB) 636, which is coupled to an instruction fetch unit 638, which is coupled to a decode unit 660. The decode unit 660 (also known as a decoder) may decode instructions, and generate as an output one or more micro-operations, micro-code entry points, microinstructions, other instructions, or other control signals, which are decoded from, or which otherwise reflect, or are derived from, the original instructions. The decoder 660 may be implemented using various different mechanisms. Examples of suitable mechanisms include, but are not limited to, look-up tables, hardware implementations, programmable logic arrays (PLAs), microcode read only memories (ROMs), etc. The instruction cache unit 634 is further coupled to the memory unit 670. The decode unit 660 is coupled to a rename/allocator unit 652 in the execution engine unit 650.

The execution engine unit 650 includes the rename/allocator unit 652 coupled to a retirement unit 654 and a set of one or more scheduler unit(s) 656. The scheduler unit(s) 656 represents any number of different schedulers, including reservations stations (RS), central instruction window, etc. The scheduler unit(s) 656 is coupled to the physical register file(s) unit(s) 658. Each of the physical register file(s) units 658 represents one or more physical register files, different ones of which store one or more different data types, such as scalar integer, scalar floating point, packed integer, packed floating point, vector integer, vector floating point, etc., status (e.g., an instruction pointer that is the address of the next instruction to be executed), etc. The physical register file(s) unit(s) 658 is overlapped by the retirement unit 654 to illustrate various ways in which register renaming and out-of-order execution may be implemented (e.g., using a reorder buffer(s) and a retirement register file(s), using a future file(s), a history buffer(s), and a retirement register file(s); using a register maps and a pool of registers; etc.).

Generally, the architectural registers are visible from the outside of the processor or from a programmer's perspective. The registers are not limited to any known particular type of circuit. Various different types of registers are suitable as long as they are capable of storing and providing data as described herein. Examples of suitable registers include, but are not limited to, dedicated physical registers, dynamically allocated physical registers using register renaming, combinations of dedicated and dynamically allocated physical registers, etc. The retirement unit 654 and the physical register file(s) unit(s) 658 are coupled to the execution cluster(s) 660. The execution cluster(s) 660 includes a set of one or more execution units 662 and a set of one or more memory access units 664. The execution units 662 may perform various operations (e.g., shifts, addition, subtraction, multiplication) and operate on various types of data (e.g., scalar floating point, packed integer, packed floating point, vector integer, vector floating point).

While some embodiments may include a number of execution units dedicated to specific functions or sets of functions, other embodiments may include only one execution unit or multiple execution units that all perform all functions. The scheduler unit(s) 656, physical register file(s) unit(s) 658, and execution cluster(s) 660 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 664). It should also be understood that where separate pipelines are used, one or more of these pipelines may be out-of-order issue/execution and the rest in-order.

The set of memory access units 664 is coupled to the memory unit 670, which may include a data prefetcher 680, a data TLB unit 672, a data cache unit (DCU) 674, and a level 2 (L2) cache unit 676, to name a few examples. In some embodiments DCU 674 is also known as a first level data cache (L1 cache). The DCU 674 may handle multiple outstanding cache misses and continue to service incoming stores and loads. It also supports maintaining cache coherency. The data TLB unit 672 is a cache used to improve virtual address translation speed by mapping virtual and physical address spaces. In one exemplary embodiment, the memory access units 664 may include a load unit, a store address unit, and a store data unit, each of which is coupled to the data TLB unit 672 in the memory unit 670. The L2 cache unit 676 may be coupled to one or more other levels of cache and eventually to a main memory.

In one embodiment, the data prefetcher 680 speculatively loads/prefetches data to the DCU 674 by automatically predicting which data a program is about to consume. Prefetching may refer to transferring data stored in one memory location (e.g., position) of a memory hierarchy (e.g., lower level caches or memory) to a higher-level memory location that is closer (e.g., yields lower access latency) to the processor before the data is actually demanded by the processor. More specifically, prefetching may refer to the early retrieval of data from one of the lower level caches/memory to a data cache and/or prefetch buffer before the processor issues a demand for the specific data being returned.

The processor 600 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.).

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes a separate instruction and data cache units and a shared L2 cache unit, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

FIG. 6B is a block diagram illustrating an in-order pipeline and a register renaming stage, out-of-order issue/execution pipeline implemented by processor 600 of FIG. 6A according to some embodiments of the disclosure. The solid lined boxes in FIG. 6B illustrate an in-order pipeline, while the dashed lined boxes illustrates a register renaming, out-of-order issue/execution pipeline. In FIG. 6B, a processor pipeline 600 includes a fetch stage 602, a length decode stage 604, a decode stage 606, an allocation stage 608, a renaming stage 610, a scheduling (also known as a dispatch or issue) stage 612, a register read/memory read stage 614, an execute stage 616, a write back/memory write stage 618, an exception handling stage 622, and a commit stage 624. In some embodiments, the ordering of stages 602-624 may be different than illustrated and are not limited to the specific ordering shown in FIG. 6B.

Figure 7:
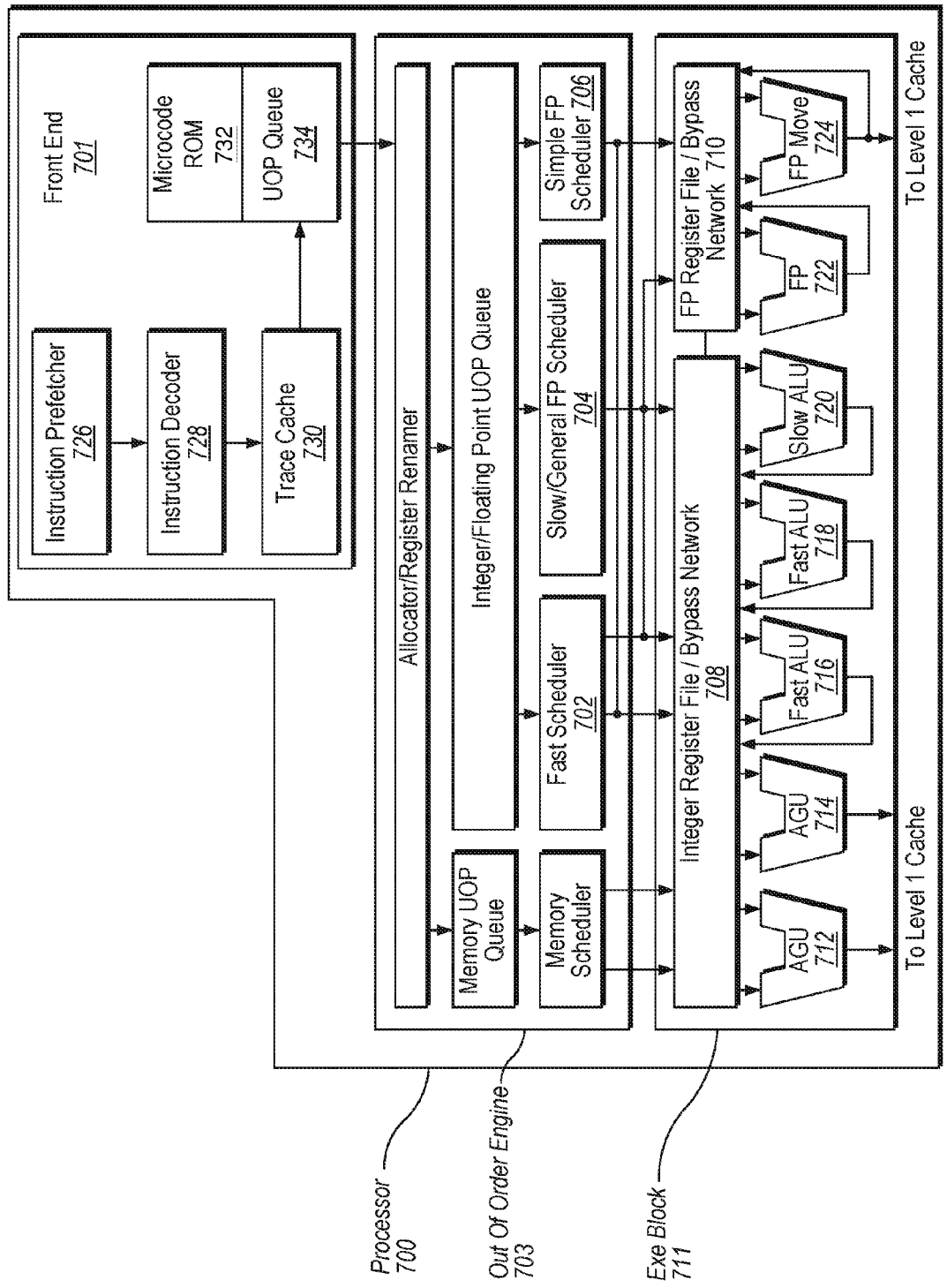
FIG. 7 illustrates a block diagram of the micro-architecture for a processor that includes logic circuits to perform secure memory repartitioning according to one embodiment.

FIG. 7 illustrates a block diagram of the micro-architecture for a processor 700 that includes logic circuits to perform secure memory repartitioning according to one embodiment. In some embodiments, an instruction in accordance with one embodiment can be implemented to operate on data elements having sizes of byte, word, doubleword, quadword, etc., as well as datatypes, such as single and double precision integer and floating point datatypes. In one embodiment the in-order front end 701 is the part of the processor 700 that fetches instructions to be executed and prepares them to be used later in the processor pipeline. The embodiments of the converting pages and sections can be implemented in processor 700.

The front end 701 may include several units. In one embodiment, the instruction prefetcher 726 fetches instructions from memory and feeds them to an instruction decoder 728 which in turn decodes or interprets them. For example, in one embodiment, the decoder decodes a received instruction into one or more operations called "micro-instructions" or "micro-operations" (also called micro op or uops) that the machine can execute. In other embodiments, the decoder parses the instruction into an opcode and corresponding data and control fields that are used by the micro-architecture to perform operations in accordance with one embodiment. In one embodiment, the trace cache 730 takes decoded uops and assembles them into program ordered sequences or traces in the uop queue 734 for execution. When the trace cache 730 encounters a complex instruction, the microcode ROM 732 provides the uops needed to complete the operation.

Some instructions are converted into a single micro-op, whereas others need several micro-ops to complete the full operation. In one embodiment, if more than four micro-ops are needed to complete an instruction, the decoder 718 accesses the microcode ROM 732 to do the instruction. For one embodiment, an instruction can be decoded into a small number of micro ops for processing at the instruction decoder 718. In another embodiment, an instruction can be stored within the microcode ROM 732 should a number of micro-ops be needed to accomplish the operation. The trace cache 730 refers to an entry point programmable logic array (PLA) to determine a correct micro-instruction pointer for reading the micro-code sequences to complete one or more instructions in accordance with one embodiment from the micro-code ROM 732. After the microcode ROM 732 finishes sequencing micro-ops for an instruction, the front end 701 of the machine resumes fetching micro-ops from the trace cache 730.

The out-of-order execution engine 703 is where the instructions are prepared for execution. The out-of-order execution logic has a number of buffers to smooth out and re-order the flow of instructions to optimize performance as they go down the pipeline and get scheduled for execution. The allocator logic allocates the machine buffers and resources that each uop needs in order to execute. The register renaming logic renames logic registers onto entries in a register file. The allocator also allocates an entry for each uop in one of the two uop queues, one for memory operations and one for non-memory operations, in front of the instruction schedulers: memory scheduler, fast scheduler 702, slow/general floating point scheduler 704, and simple floating point scheduler 706. The uop schedulers 702, 704, 706, determine when a uop is ready to execute based on the readiness of their dependent input register operand sources and the availability of the execution resources the uops need to complete their operation. The fast scheduler 702 of one embodiment can schedule on each half of the main clock cycle while the other schedulers can only schedule once per main processor clock cycle. The schedulers arbitrate for the dispatch ports to schedule uops for execution.

Register files 708, 710, sit between the schedulers 702, 704, 706, and the execution units 712, 714, 716, 718, 720, 722, 724 in the execution block 711. There is a separate register file 708, 710, for integer and floating point operations, respectively. Each register file 708, 710, of one embodiment also includes a bypass network that can bypass or forward just completed results that have not yet been written into the register file to new dependent uops. The integer register file 708 and the floating point register file 710 are also capable of communicating data with the other. For one embodiment, the integer register file 708 is split into two separate register files, one register file for the low order 32 bits of data and a second register file for the high order 32 bits of data. The floating point register file 710 of one embodiment has 128 bit wide entries because floating point instructions typically have operands from 64 to 128 bits in width.

The execution block 711 contains the execution units 712, 714, 716, 718, 710, 712, 714, where the instructions are actually executed. This section includes the register files 708, 710, that store the integer and floating point data operand values that the micro-instructions need to execute. The processor 700 of one embodiment is comprised of a number of execution units: address generation unit (AGU) 712, AGU 714, fast ALU 716, fast ALU 718, slow ALU 710, floating point ALU 712, floating point move unit 714. For one embodiment, the floating point execution blocks 712, 714, execute floating point, MMX, SIMD, and SSE, or other operations. The floating point ALU 712 of one embodiment includes a 64 bit by 64 bit floating point divider to execute divide, square root, and remainder micro-ops. For embodiments of the present disclosure, instructions involving a floating point value may be handled with the floating point hardware.

In one embodiment, the ALU operations go to the high-speed ALU execution units 716, 718. The fast ALUs 716, 718, of one embodiment can execute fast operations with an effective latency of half a clock cycle. For one embodiment, most complex integer operations go to the slow ALU 710 as the slow ALU 710 includes integer execution hardware for long latency type of operations, such as a multiplier, shifts, flag logic, and branch processing. Memory load/store operations are executed by the AGUs 712, 714. For one embodiment, the integer ALUs 716, 718, 710, are described in the context of performing integer operations on 64 bit data operands. In alternative embodiments, the ALUs 716, 718, 710, can be implemented to support a variety of data bits including 16, 32, 128, 256, etc. Similarly, the floating point units 712, 714, can be implemented to support a range of operands having bits of various widths. For one embodiment, the floating point units 712, 714, can operate on 128 bits wide packed data operands in conjunction with SIMD and multimedia instructions.

In one embodiment, the uops schedulers 702, 704, 706, dispatch dependent operations before the parent load has finished executing. As uops are speculatively scheduled and executed in processor 700, the processor 700 also includes logic to handle memory misses. If a data load misses in the data cache, there can be dependent operations in flight in the pipeline that have left the scheduler with temporarily incorrect data. A replay mechanism tracks and re-executes instructions that use incorrect data. Only the dependent operations need to be replayed and the independent ones are allowed to complete. The schedulers and replay mechanism of one embodiment of a processor are also designed to catch instruction sequences for text string comparison operations.

The processor 700 also includes logic to implement secure memory repartitioning according to one embodiment. In one embodiment, the execution block 711 of processor 700 may include MCU 115, to perform secure memory repartitioning according to the description herein.

The term "registers" may refer to the on-board processor storage locations that are used as part of instructions to identify operands. In other words, registers may be those that are usable from the outside of the processor (from a programmer's perspective). However, the registers of an embodiment should not be limited in meaning to a particular type of circuit. Rather, a register of an embodiment is capable of storing and providing data, and performing the functions described herein. The registers described herein can be implemented by circuitry within a processor using any number of different techniques, such as dedicated physical registers, dynamically allocated physical registers using register renaming, combinations of dedicated and dynamically allocated physical registers, etc. In one embodiment, integer registers store thirty-two bit integer data. A register file of one embodiment also contains eight multimedia SIMD registers for packed data.

For the discussions herein, the registers are understood to be data registers designed to hold packed data, such as 64 bits wide MMX™ registers (also referred to as 'mm' registers in some instances) in microprocessors enabled with MMX technology from Intel Corporation of Santa Clara, Calif. These MMX registers, available in both integer and floating point forms, can operate with packed data elements that accompany SIMD and SSE instructions. Similarly, 128 bits wide XMM registers relating to SSE2, SSE3, SSE4, or beyond (referred to generically as "SSEx") technology can also be used to hold such packed data operands. In one embodiment, in storing packed data and integer data, the registers do not need to differentiate between the two data types. In one embodiment, integer and floating point are either contained in the same register file or different register files. Furthermore, in one embodiment, floating point and integer data may be stored in different registers or the same registers.

Figure 8:
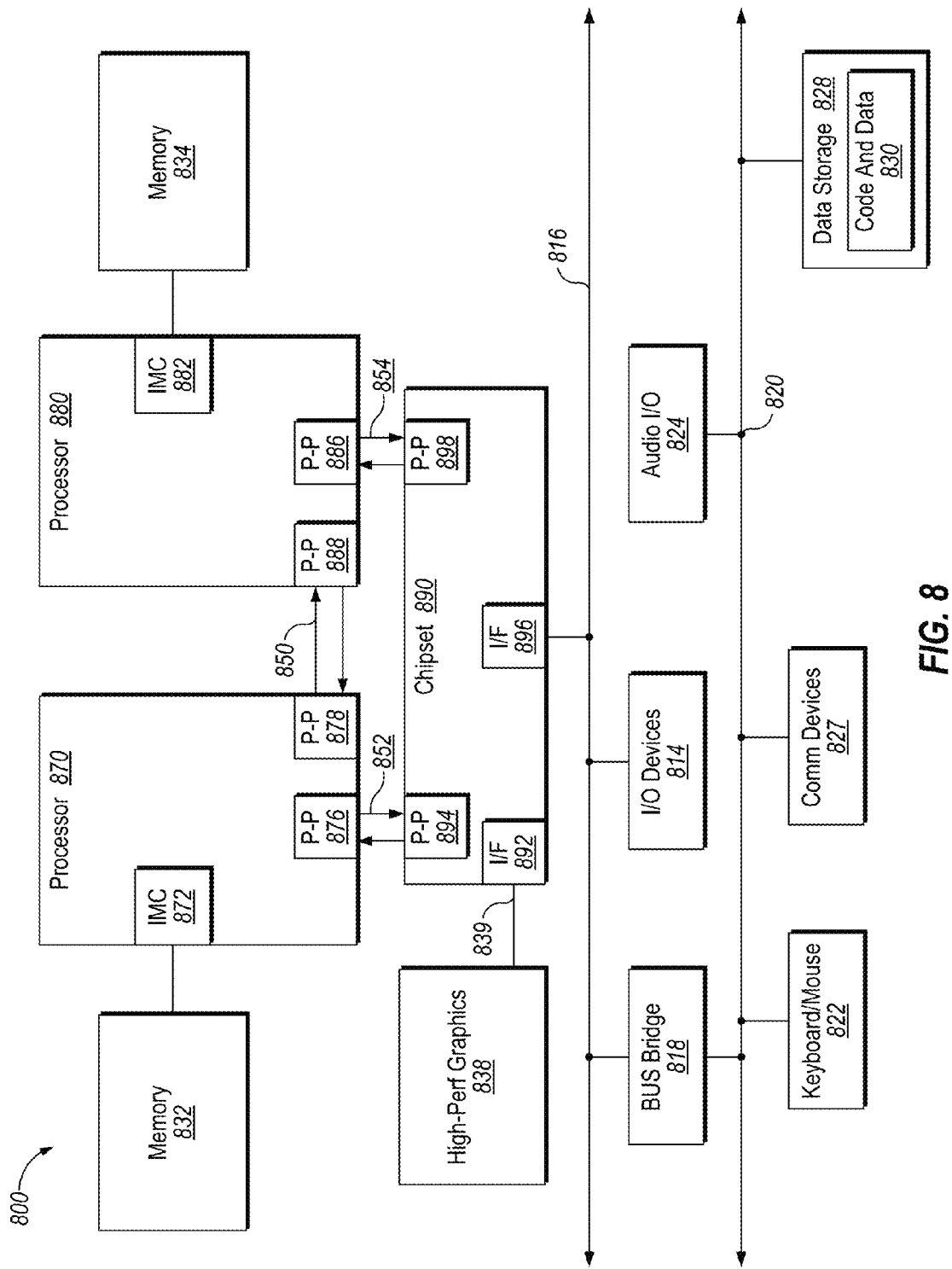
FIG. 8 is a block diagram of a computer system according to one implementation.

Embodiments may be implemented in many different system types. Referring now to FIG. 8, shown is a block diagram of a multiprocessor system 800 in accordance with an implementation. As shown in FIG. 8, multiprocessor system 800 is a point-to-point interconnect system, and includes a first processor 870 and a second processor 880 coupled via a point-to-point interconnect 850. As shown in FIG. 8, each of processors 870 and 880 may be multicore processors, including first and second processor cores (i.e., processor cores 874*a* and 874*b* and processor cores 884*a* and 884*b*), although potentially many more cores may be present in the processors. The processors each may include hybrid write mode logics in accordance with an embodiment of the present. The embodiments of the converting pages and sections can be implemented in the processor 870, processor 880, or both.

While shown with two processors 870, 880, it is to be understood that the scope of the present disclosure is not so limited. In other implementations, one or more additional processors may be present in a given processor.

Processors 870 and 880 are shown including integrated memory controller units 872 and 882, respectively. Processor 870 also includes as part of its bus controller units point-to-point (P-P) interfaces 876 and 878; similarly, second processor 880 includes P-P interfaces 886 and 888. Processors 870, 880 may exchange information via a point-to-point (P-P) interface 850 using P-P interface circuits 888, 888. As shown in FIG. 8, IMCs 872 and 882 couple the processors to respective memories, namely a memory 832 and a memory 834, which may be portions of main memory locally attached to the respective processors.

Processors 870, 880 may each exchange information with a chipset 890 via individual P-P interfaces 852, 854 using point to point interface circuits 876, 894, 886, 898. Chipset 890 may also exchange information with a high-performance graphics circuit 838 via a high-performance graphics interface 839 using an interface circuit 892.

A shared cache (not shown) may be included in either processor or outside of both processors, yet connected with the processors via P-P interconnect, such that either or both processors' local cache information may be stored in the shared cache if a processor is placed into a low power mode.

Chipset 890 may be coupled to a first bus 816 via an interface 896. In one embodiment, first bus 816 may be a Peripheral Component Interconnect (PCI) bus, or a bus such as a PCI Express bus or another third generation I/O interconnect bus, although the scope of the present disclosure is not so limited.

As shown in FIG. 8, various I/O devices 814 may be coupled to first bus 816, along with a bus bridge 818 which couples first bus 816 to a second bus 820. In one embodiment, second bus 820 may be a low pin count (LPC) bus. Various devices may be coupled to second bus 820 including, for example, a keyboard and/or mouse 822, communication devices 827 and a storage unit 828 such as a disk drive or other mass storage device which may include instructions/code and data 830, in one embodiment. Further, an audio I/O 824 may be coupled to second bus 820. Note that other architectures are possible. For example, instead of the point-to-point architecture of FIG. 8, a system may implement a multi-drop bus or other such architecture.

Figure 9:
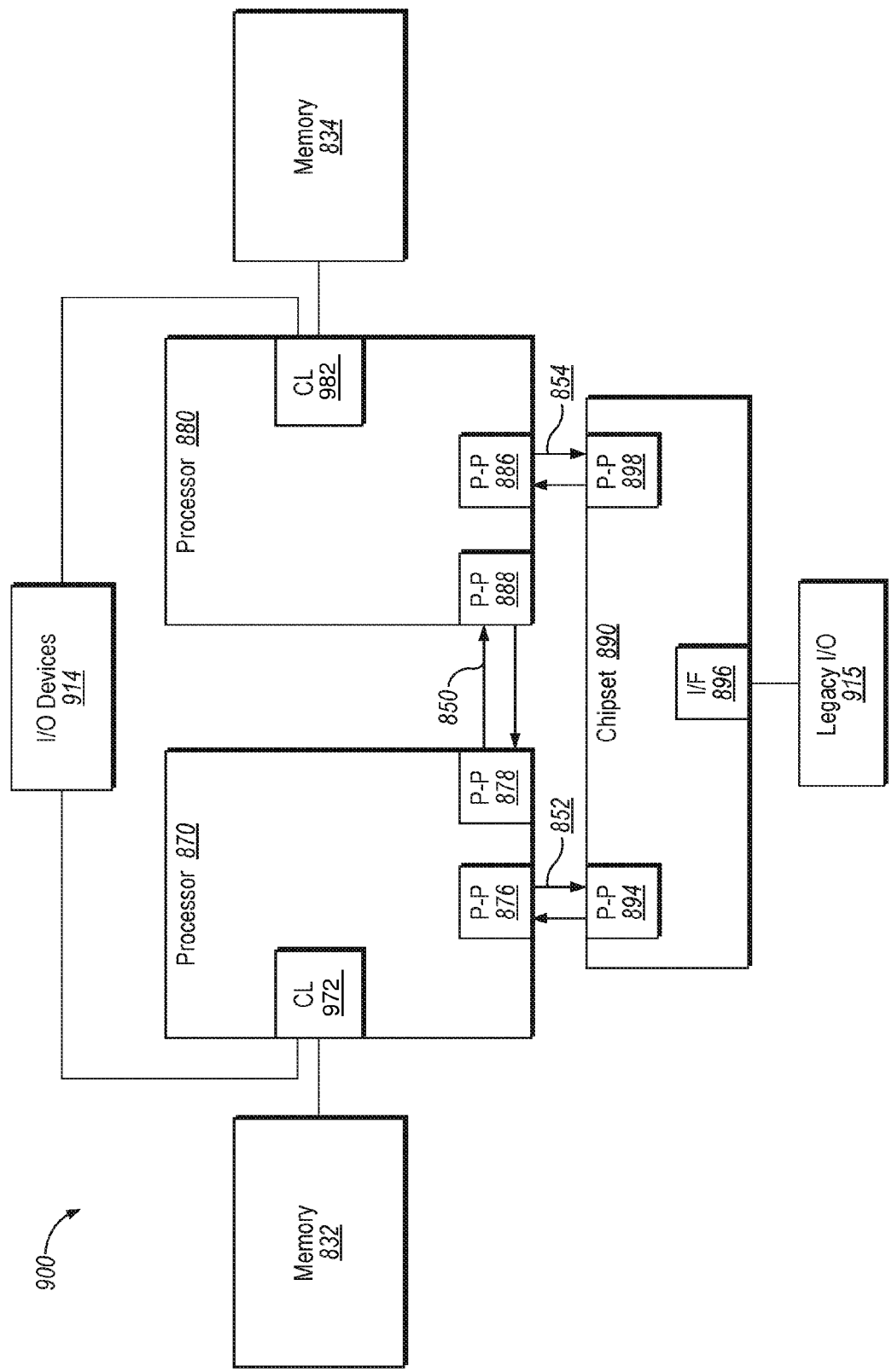
FIG. 9 is a block diagram of a computer system according to another implementation.

Referring now to FIG. 9, shown is a block diagram of a third system 900 in accordance with an embodiment of the present invention. Like elements in FIGS. 8 and 9 bear like reference numerals, and certain aspects of FIG. 8 have been omitted from FIG. 9 in order to avoid obscuring other aspects of FIG. 9.

FIG. 9 illustrates that the processors 970, 980 may include integrated memory and I/O control logic ("CL") 972 and 982, respectively. For at least one embodiment, the CL 972, 982 may include integrated memory controller units such as described herein. In addition. CL 972, 982 may also include I/O control logic. FIG. 9 illustrates that the memories 932, 934 are coupled to the CL 972, 982, and that I/O devices 914 are also coupled to the control logic 972, 982. Legacy I/O devices 915 are coupled to the chipset 990. The embodiments of the converting pages and sections can be implemented in processor 970, processor 980, or both.

Figure 10:
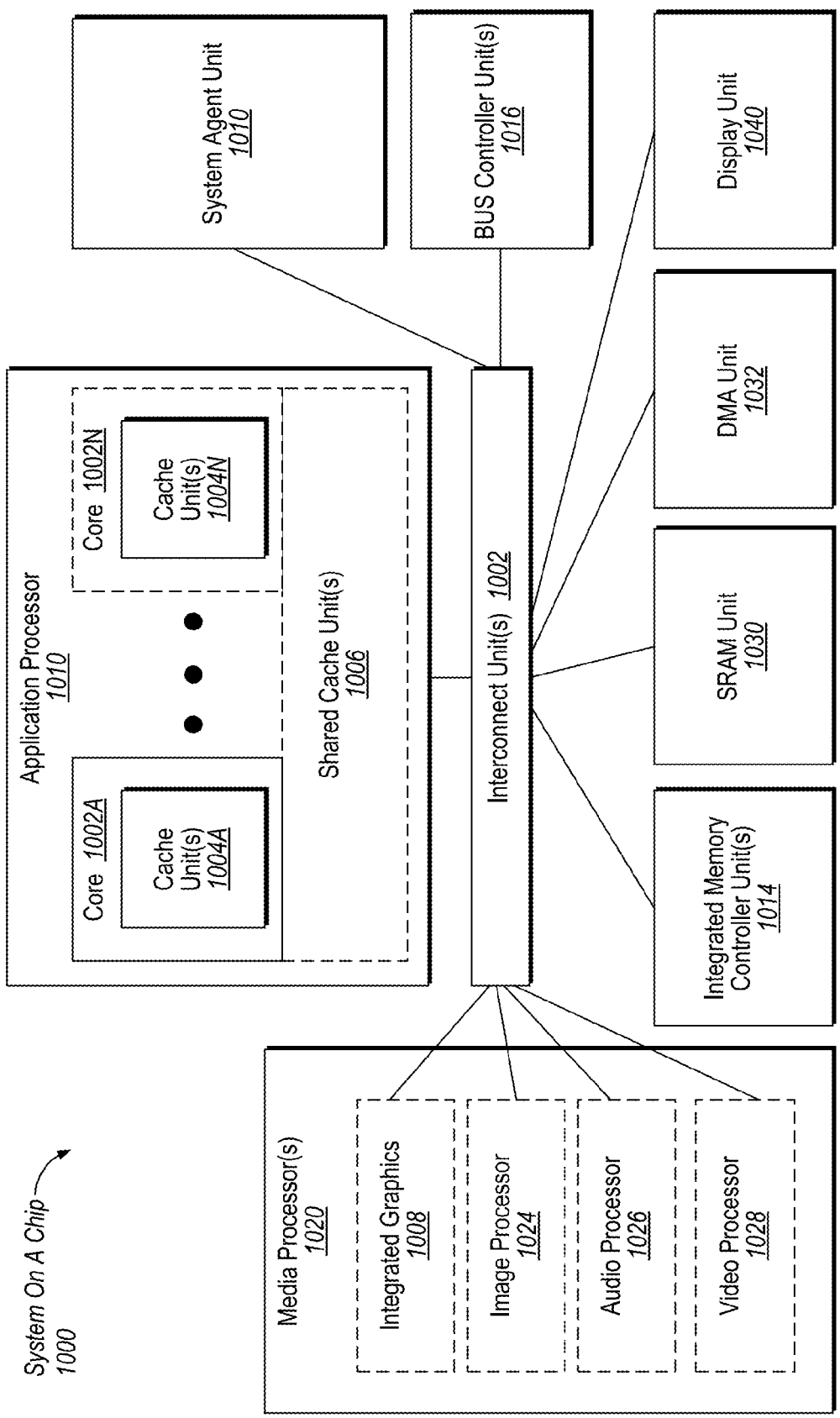
FIG. 10 is a block diagram of a system-on-a-chip according to one implementation.

FIG. 10 is an exemplary system on a chip (SoC) that may include one or more of the cores 1002 with corresponding cache units 1004. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Referring now to FIG. 10, shown is a block diagram of a SoC 1000 in accordance with an embodiment of the present disclosure. Similar elements in FIG. 5 bear like reference numerals. Also, dashed lined boxes are features on more advanced SoCs. In FIG. 10, an interconnect unit(s) 1002 is coupled to: an application processor 1010 which includes a set of one or more cores 1002A-N, one or more cache units 1004A-N, and shared cache unit(s) 1006; a system agent unit 1010; a bus controller unit(s) 1016; an integrated memory controller unit(s) 1014; a set or one or more media processors 1020 which may include integrated graphics logic 1008, an image processor 1024 for providing still and/or video camera functionality, an audio processor 1026 for providing hardware audio acceleration, and a video processor 1028 for providing video encode/decode acceleration; a static random access memory (SRAM) unit 1030; a direct memory access (DMA) unit 1032; and a display unit 1040 for coupling to one or more external displays. The embodiments of the converting pages and sections can be implemented in SoC 1000.

Figure 11:
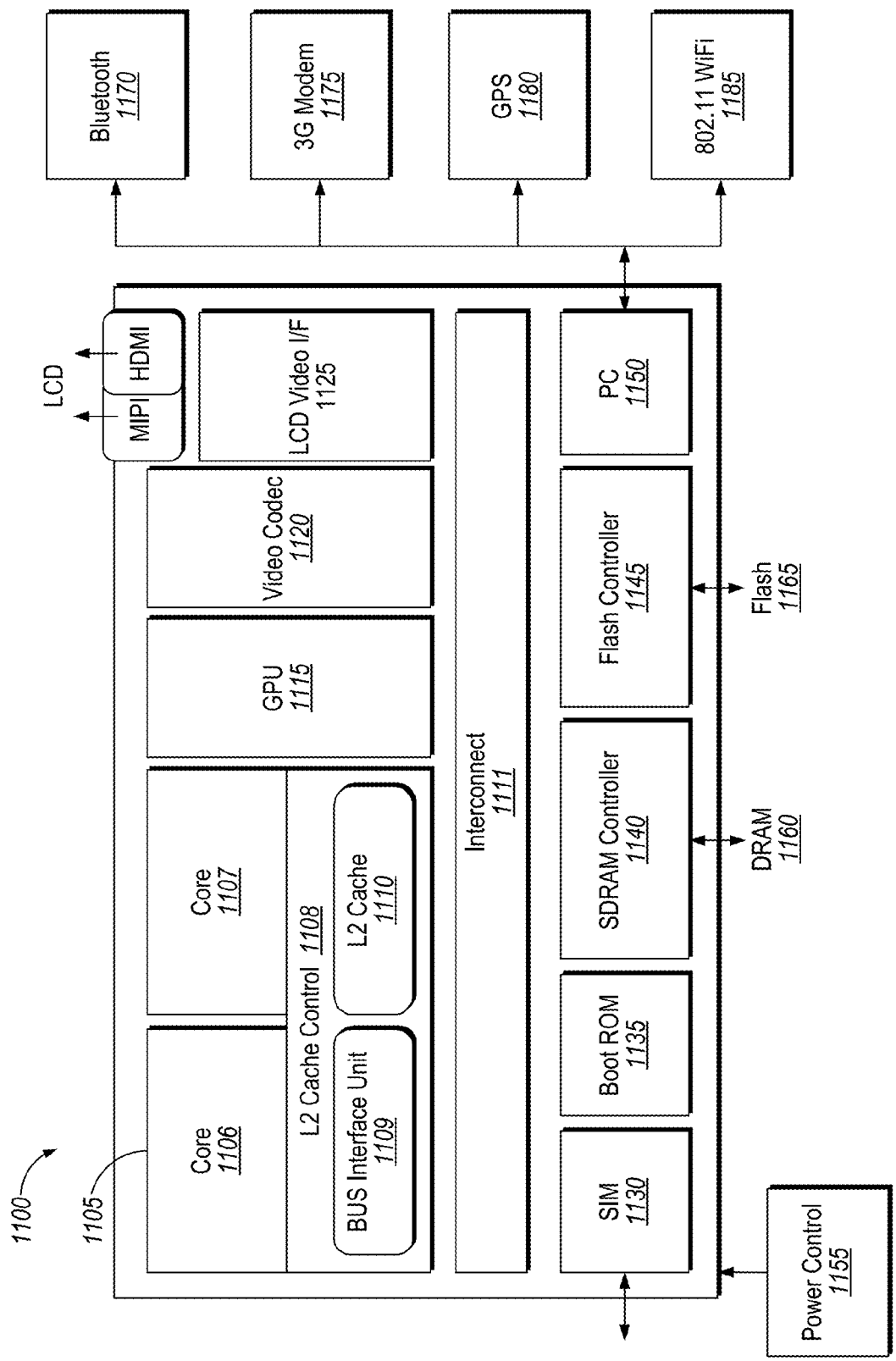
FIG. 11 illustrates another implementation of a block diagram for a computing system.

Turning next to FIG. 11, an embodiment of a system on-chip (SoC) design in accordance with embodiments of the disclosure is depicted. As an illustrative example, SoC 1100 is included in user equipment (UE). In one embodiment, UE refers to any device to be used by an end-user to communicate, such as a hand-held phone, smartphone, tablet, ultra-thin notebook, notebook with broadband adapter, or any other similar communication device. A UE may connect to a base station or node, which can correspond in nature to a mobile station (MS) in a GSM network. The embodiments of the converting pages and sections can be implemented in SoC 1100.

Here, SoC 1100 includes 2 cores—1106 and 1107. Similar to the discussion above, cores 1106 and 1107 may conform to an Instruction Set Architecture, such as a processor having the Intel® Architecture Core™, an Advanced Micro Devices, Inc. (AMD) processor, a MIPS-based processor, an ARM-based processor design, or a customer thereof, as well as their licensees or adopters. Cores 1106 and 1107 are coupled to cache control 1108 that is associated with bus interface unit 1109 and L2 cache 1110 to communicate with other parts of system 1100. Interconnect 1111 includes an on-chip interconnect, such as an IOSF, AMBA, or other interconnects discussed above, which can implement one or more aspects of the described disclosure.

Interconnect 1111 provides communication channels to the other components, such as a Subscriber Identity Module (SIM) 1130 to interface with a SIM card, a boot ROM 1135 to hold boot code for execution by cores 1106 and 1107 to initialize and boot SoC 1100, a SDRAM controller 1140 to interface with external memory (e.g. DRAM 1160), a flash controller 1145 to interface with non-volatile memory (e.g. Flash 1165), a peripheral control 1150 (e.g. Serial Peripheral Interface) to interface with peripherals, video codecs 1120 and Video interface 1125 to display and receive input (e.g. touch enabled input), GPU 1115 to perform graphics related computations, etc. Any of these interfaces may incorporate aspects of the embodiments described herein.

In addition, the system illustrates peripherals for communication, such as a Bluetooth module 1170, 3G modem 1175, GPS 1180, and Wi-Fi 1185. Note as stated above, a UE includes a radio for communication. As a result, these peripheral communication modules may not all be included. However, in a UE some form of a radio for external communication should be included.

Figure 12:
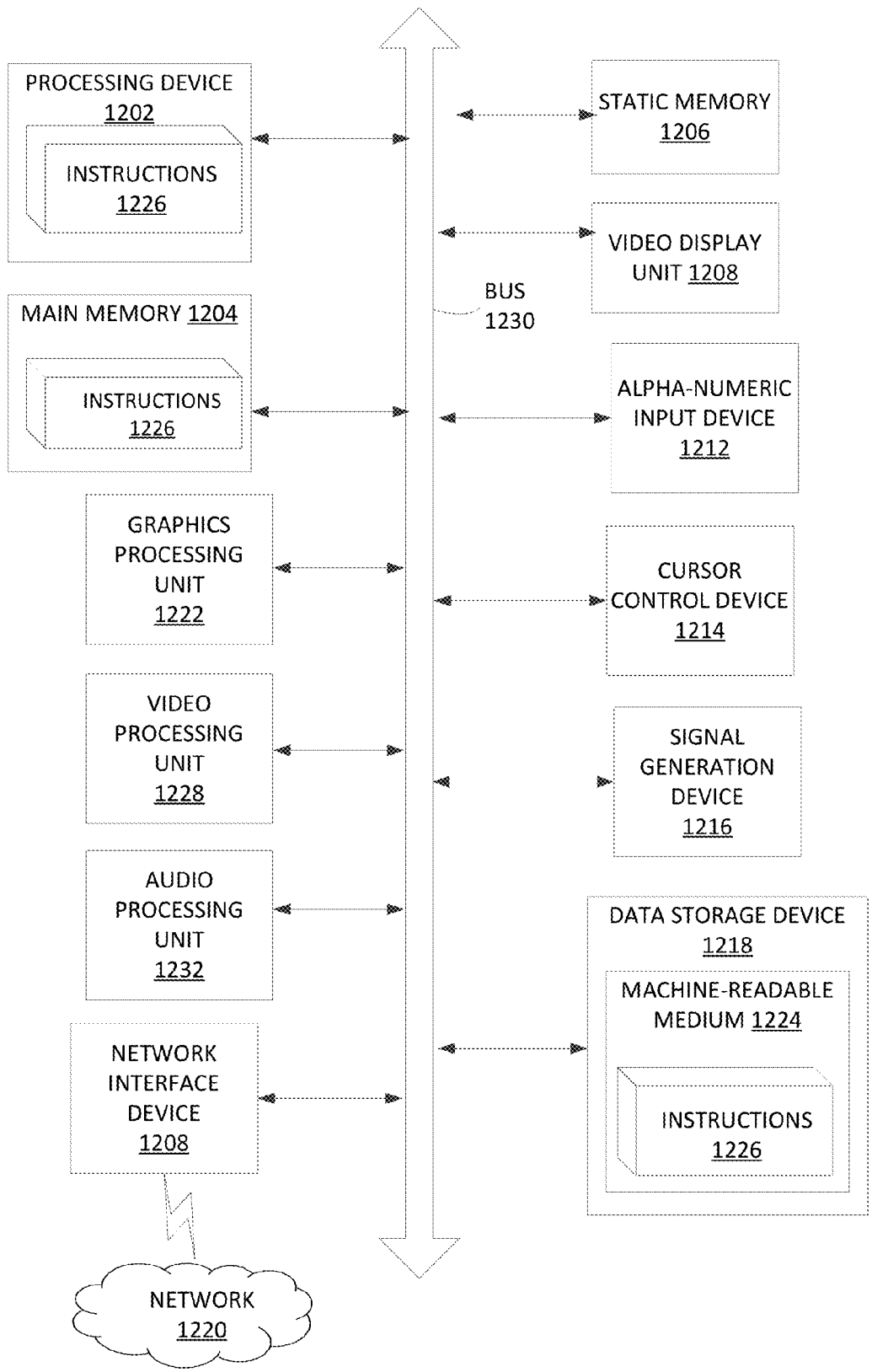
FIG. 12 illustrates another implementation of a block diagram for a computing system.

FIG. 12 illustrates a diagrammatic representation of a machine in the example form of a computing system 1200 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client device in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. The embodiments of the converting pages and sections can be implemented in computing system 1200.

The computing system 1200 includes a processing device 1202, main memory 1204 (e.g., read-only memory (ROM), flash memory, dynamic random access memory (DRAM) (such as synchronous DRAM (SDRAM) or DRAM (RDRAM), etc.), a static memory 1206 (e.g., flash memory, static random access memory (SRAM), etc.), and a data storage device 1218, which communicate with each other via a bus 1230.

Processing device 1202 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 1202 may also be one or more special-purpose processing devices such as an application specific integrated circuit (ASIC), a field programmable gate array (FPGA), a digital signal processor (DSP), network processor, or the like. In one embodiment, processing device 1202 may include one or processor cores. The processing device 1202 is configured to execute the processing logic 1226 for performing the operations discussed herein. In one embodiment, processing device 1202 can be part of the computing system 100 of FIG. 1. Alternatively, the computing system 1200 can include other components as described herein. It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

The computing system 1200 may further include a network interface device 1208 communicably coupled to a network 1220. The computing system 1200 also may include a video display unit 1210 (e.g., a liquid crystal display (LCD) or a cathode ray tube (CRT)), an alphanumeric input device 1212 (e.g., a keyboard), a cursor control device 1214 (e.g., a mouse), a signal generation device 1216 (e.g., a speaker), or other peripheral devices. Furthermore, computing system 1200 may include a graphics processing unit 1222, a video processing unit 1228 and an audio processing unit 1232. In another embodiment, the computing system 1200 may include a chipset (not illustrated), which refers to a group of integrated circuits, or chips, that are designed to work with the processing device 1202 and controls communications between the processing device 1202 and external devices. For example, the chipset may be a set of chips on a motherboard that links the processing device 1202 to very high-speed devices, such as main memory 1204 and graphic controllers, as well as linking the processing device 1202 to lower-speed peripheral buses of peripherals, such as USB, PCI or ISA buses.

The data storage device 1218 may include a computer-readable storage medium 1224 on which is stored software 1226 embodying any one or more of the methodologies of functions described herein. The software 1226 may also reside, completely or at least partially, within the main memory 1204 as instructions 1226 and/or within the processing device 1202 as processing logic 1226 during execution thereof by the computing system 1200; the main memory 1204 and the processing device 1202 also constituting computer-readable storage media.

The computer-readable storage medium 1224 may also be used to store instructions 1226 utilizing the processing device 1202, such as described with respect to FIG. 1, and/or a software library containing methods that call the above applications. While the computer-readable storage medium 1224 is shown in an example embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instruction for execution by the machine and that cause the machine to perform any one or more of the methodologies of the present embodiments. The term "computer-readable storage medium" shall accordingly be taken to include, but not be limited to, solid-state memories, and optical and magnetic media.

The following examples pertain to further embodiments.

Example 1 is a processor comprising: 1) a processor core; and 2) a memory controller coupled between the processor core and main memory, wherein the main memory comprises a memory range comprising a section of convertible pages that can be converted to secure pages or non-secure pages, and wherein the processor core, in response to a page conversion instruction, is to: a) determine from the instruction a convertible page in the memory range to be converted; and b) convert the convertible page to be at least one of a secure page or a non-secure page.

In Example 2, the page conversion instruction of Example 1 is a first conversion instruction, and the processor core is to convert the convertible page from a non-secure page to a secure page in response to the first conversion instruction.

In Example 3, in the processor core of any one of Examples 1-2 is to perform the following in response to the first conversion instruction: a) ensure that an address of the convertible page points to a page that is convertible to a secure page; b) verify that a secure bit of a page cache map entry corresponding to the convertible page is set to be non-secure; c) invalidate cached page contents from a cache of the processor; d) set the secure bit of the page cache map entry to be secure; and e) invalidate a translation for the address for the processor core.

In Example 4, the page conversion instruction in the processor of any one of Examples 1-3, is a second conversion instruction, and the processor core is to convert the convertible page from a secure page to a non-secure page in response to the second conversion instruction.

In Example 5, the processor core of any one of Examples 1-4 is to perform the following in response to the second conversion instruction: a) ensure that an address of the convertible page points to a page that is convertible to a non-secure page; b) verify that a secure bit of a page cache map entry corresponding to the convertible page is set to be secure; c) verify that a valid bit of the page cache map entry is set to invalid; d) invalidate cached page contents from a cache of the processor; e) set the secure bit of the page cache map entry to be non-secure; and f) invalidate a translation for the address for the processor core.

In Example 6, the memory range of any of Examples 1-5, comprises a hardware reserved section, wherein the processor core, in response to a section conversion instruction, is to convert the hardware reserved section to be at least one of a secure section or a non-secure section.

In Example 7, the section conversion instruction of any of Examples 1-6, is a third conversion instruction, and the processor core is to convert the hardware reserved section from a non-secure section to a secure section in response to the third conversion instruction.

In Example 8, the processor of Examples 1-7, further comprises a MEE coupled between the processor core and the main memory, and the processor core is to perform the following in response to the third conversion instruction: a) ensure that an address of the third conversion instruction points to a page in the hardware reserved section; b) ensure that the hardware reserved section of the memory range is set as convertible, currently non-secure; c) instruct the MEE to install a replay-protection filter for the hardware reserved section; and d) instruct the MEE to put the hardware reserved section in an initialized state.

In Example 9, the section conversion instruction of any of Examples 1-9 is a fourth conversion instruction, and wherein the processor core is to convert the hardware reserved section from a secure section to a non-secure section in response to the fourth conversion instruction.

In Example 10, the processor of any of Examples 1-9, further comprises a MEE coupled between the processor core and the main memory, wherein the hardware reserved section stores replay-protection and integrity metadata for the memory range, wherein the processor core is to perform the following in response to the fourth conversion instruction: a) ensure that an address of the fourth conversion instruction points to a page in the hardware reserved section; b) ensure that pages in the EPC section corresponding to the hardware reserved section are in a non-secure state; c) instruct the MEE to uninstall a replay-protection filter for the hardware reserved section; and d)) instruct the MEE to flush contents of the hardware reserved section (e.g., replay-protection section) from its internal cache.

In Example 11, the memory range any of Examples 1-10, further comprises another hardware reserved section that cannot be converted.

In Example 12, the main memory any of Examples 1-11, comprises a non-secure memory range.

Various embodiments may have different combinations of the structural features described above. For instance, all optional features of the computing system described above may also be implemented with respect to the method or process described herein and specifics in the examples may be used anywhere in one or more embodiments.

In example 13, a method comprises 1) decoding, by a processor core of a processor, a page conversion instruction to convert a convertible page in a memory range in main memory coupled to the processor core, wherein the memory range comprises a section of convertible pages are convertible to secure pages or non-secure pages; and 2) executing, by the processor core, the page conversion instruction to convert the convertible page to be at least one of a secure page or a non-secure page.

In Example 14, the method of Example 13 further comprises converting, by the processor core, the convertible page from a non-secure page to a secure page when the page conversion instruction is a first conversion instruction; and converting, by the processor core, the convertible page from the secure page to the non-secure page when the page conversion instruction is a second conversion instruction.

In Example 15, the method of any of Examples 13-14 further comprises: in response to the first conversion instruction, a) ensuring that an address of the convertible page points to a page that is convertible to a secure page; b) verifying that a secure bit of a page cache map entry corresponding to the convertible page is set to be non-secure; c) invalidating cached page contents from a cache of the processor; d) setting the secure bit of the page cache map entry to be secure; and e) invalidating a translation for the address for the processor core.

In Example 16, the method of any of Examples 13-15 further comprises: in response to the second conversion instruction, a) ensuring that an address of the convertible page points to a page that is convertible to a non-secure page; b) verifying that a secure bit of a page cache map entry corresponding to the convertible page is set to be secure; c) verifying that a valid bit of the page cache map entry is set to invalid; d) invalidating cached page contents from a cache of the processor; e) setting the secure bit of the page cache map entry to be non-secure; and f) invalidating a translation for the address for the processor core.

In Example 17, in the method of any of Examples 13-16, the memory range further comprises a hardware reserved section, the method further comprises: a) decoding, by the processor core, a section conversion instruction to convert the hardware reserved section in the memory range; and b) executing the section conversion instruction to convert the hardware reserved section to be at least one of a secure section or a non-secure section.

In Example 18, the method of any of Examples 13-17 further comprises converting, by the processor core, the hardware reserved section from a non-secure section to a secure section when the section conversion instruction is a third conversion instruction; and converting, by the processor core, the hardware reserved section from the secure section to the non-secure section when the section conversion instruction is a fourth conversion instruction.

In Example 19, the method of any of Examples 13-18, further comprising: in response to the third conversion instruction to convert a hardware reserved section from non-secure to secure: a) ensuring that an address of the third conversion instruction points to a page in the hardware reserved section; b) ensuring that the hardware reserved section of the memory range is set as convertible, currently non-secure; c) instructing a memory encryption engine (MEE) coupled between the processor core and the main memory to install a replay-protection filter for the hardware reserved section; and d) instructing the MEE to put the hardware reserved section in an initialized state; and, in response to the fourth conversion instruction to convert the hardware reserved section from secure to non-secure: e) ensuring that an address of the fourth conversion instruction points to a page in the hardware reserved section; f) ensuring that pages in EPC section corresponding to the hardware reserved section are in a non-secure state; g) instructing the MEE to uninstall the replay-protection filter for the hardware reserved section; and h) instructing the MEE to flush contents of the hardware reserved section (e.g., replay-protection section) from its internal cache.

Various embodiments may have different combinations of the structural features described above. For instance, all optional features of the processors and methods described above may also be implemented with respect to a system described herein and specifics in the examples may be used anywhere in one or more embodiments.

Example 20 is a system comprising: 1) a processor comprising a plurality of functional units to execute instructions; and 2) a memory device coupled to the processor, wherein the memory device is operable to store code memory and data memory and comprises a memory range comprising a section of convertible pages are convertible to secure pages or non-secure pages, wherein the processor core is configured to: a) decode a page conversion instruction to convert a convertible page in the memory range; and b) execute the page conversion instruction to convert the convertible page to be at least one of a secure page or a non-secure page.

In Example 21, in the system of Example 20, the page conversion instruction is a first conversion instruction, and wherein the processor core is to convert the convertible page from a non-secure page to a secure page in response to the first conversion instruction, and wherein the processor core is to perform the following in response to the first conversion instruction: a) ensure that an address of the convertible page points to a page that is convertible to a secure page; b) verify that a secure bit of a page cache map entry corresponding to the convertible page is set to be non-secure; c) invalidate cached page contents from a cache of the processor; d) set the secure bit of the page cache map entry to be secure; and e) invalidate a translation for the address for the processor core.

In Example 22, in the system of any of Examples 20-21, the page conversion instruction is a second conversion instruction, and wherein the processor core is to convert the convertible page from a secure page to a non-secure page in response to the second conversion instruction, and wherein the processor core is to perform the following in response to the second conversion instruction: a) ensure that an address of the convertible page points to a page that is convertible to a non-secure page; b) verify that a secure bit of a page cache map entry corresponding to the convertible page is set to be secure; c) verify that a valid bit of the page cache map entry is set to invalid; d) invalidate cached page contents from a cache of the processor; e) set the secure bit of the page cache map entry to be non-secure; and f) invalidate a translation for the address for the processor core.

In Example 23, in the system of any of Examples 20-22, the memory range further comprises a hardware reserved section, wherein the processor core, in response to a section conversion instruction, is to: a) decode a section conversion instruction to convert the hardware reserved section; and b) execute the section conversion instruction to convert the hardware reserved section to be at least one of a secure section or a non-secure section.

In Example 24, the system of any of Examples 20-23, further comprises a MEE coupled between the processor core and the main memory, wherein the section conversion instruction is a third conversion instruction, and wherein the processor core is to convert the hardware reserved section from a non-secure section to a secure section in response to the third conversion instruction, wherein the processor core is to perform the following in response to the third conversion instruction: a) ensure that an address of the third conversion instruction points to a page in the hardware reserved section; b) ensure that the hardware reserved section of the memory range is set as convertible, currently non-secure; c) instruct the MEE to install a replay-protection filter for the hardware reserved section; and d) instruct the MEE to put the hardware reserved section in an initialized state.

In Example 25, the system of any of Examples 20-24, further comprises a MEE coupled between the processor core and the main memory, wherein the section conversion instruction is a fourth conversion instruction, and wherein the MEE is to convert the hardware reserved section from a secure section to a non-secure section in response to the fourth conversion instruction, wherein the processor core is to perform the following in response to the fourth conversion instruction: a) ensure that an address of the fourth conversion instruction points to a page in the hardware reserved section; b) ensure that pages in the EPC section corresponding to the hardware reserved section are in a non-secure state; c) instruct the MEE to uninstall a replay-protection filter for the hardware reserved section; and d) instruct the MEE to flush contents of the hardware reserved section from its internal cache.

Various embodiments may have different combinations of the operational features described above. For instance, all optional features of the method described above may also be implemented with respect to a non-transitory, computer-readable storage medium. Specifics in the examples may be used anywhere in one or more embodiments.

Example 26 is a non-transitory, computer-readable storage medium including instructions that, when executed by a processor, cause the processor to perform the method of Examples 13-19.

Example 27 is a system comprising a system on chip (SoC) comprising a processor core to execute instructions and a memory controller unit (MCU) coupled to the processor core, wherein processor core is configured to perform the method of Examples 15-21.

In Example 28, the SoC of Example 27 further comprises the subject matter of Examples 1-14 and 22-27.

Example 29 is an apparatus comprising: 1) a processor core of a processor; 2) means for decoding a page conversion instruction to convert a convertible page in a memory range in main memory, coupled to the processor core, wherein the memory range comprises a section of convertible pages are convertible to secure pages or non-secure pages; and 3) means for executing the page conversion instruction to convert the convertible page to be at least one of a secure page or a non-secure page.

In Example 30, the apparatus of Example 29 further comprises subject matter of Examples 1-14 and 22-27.

Example 31 is a system comprising: a memory device and a processor comprising a memory encryption engine (MEE) wherein the processor is configured to perform the method of any of Examples 13-19.

In Example 32, the processor of Example 31 further comprises the subject matter of any of Examples 1-12 and 20-25.

While the present invention has been described with respect to a limited number of embodiments, those skilled in the art will appreciate numerous modifications and variations therefrom. It is intended that the appended claims cover all such modifications and variations as fall within the true spirit and scope of this present invention.

In the description herein, numerous specific details are set forth, such as examples of specific types of processors and system configurations, specific hardware structures, specific architectural and micro architectural details, specific register configurations, specific instruction types, specific system components, specific measurements/heights, specific processor pipeline stages and operation etc. in order to provide a thorough understanding of the present invention. It will be apparent, however, to one skilled in the art that these specific details need not be employed to practice the present invention. In other instances, well known components or methods, such as specific and alternative processor architectures, specific logic circuits/code for described algorithms, specific firmware code, specific interconnect operation, specific logic configurations, specific manufacturing techniques and materials, specific compiler implementations, specific expression of algorithms in code, specific power down and gating techniques/logic and other specific operational details of computer system have not been described in detail in order to avoid unnecessarily obscuring the present invention.

The embodiments are described with reference to secure memory repartitioning in specific integrated circuits, such as in computing platforms or microprocessors. The embodiments may also be applicable to other types of integrated circuits and programmable logic devices. For example, the disclosed embodiments are not limited to desktop computer systems or portable computers, such as the Intel® Ultra-books™ computers. And may be also used in other devices, such as handheld devices, tablets, other thin notebooks, systems on a chip (SoC) devices, and embedded applications. Some examples of handheld devices include cellular phones, Internet protocol devices, digital cameras, personal digital assistants (PDAs), and handheld PCs. Embedded applications typically include a microcontroller, a digital signal processor (DSP), a system on a chip, network computers (NetPC), set-top boxes, network hubs, wide area network (WAN) switches, or any other system that can perform the functions and operations taught below. It is described that the system can be any kind of computer or embedded system. The disclosed embodiments may especially be used for low-end devices, like wearable devices (e.g., watches), electronic implants, sensory and control infrastructure devices, controllers, supervisory control and data acquisition (SCADA) systems, or the like. Moreover, the apparatuses, methods, and systems described herein are not limited to physical computing devices, but may also relate to software optimizations for energy conservation and efficiency. As will become readily apparent in the description below, the embodiments of methods, apparatuses, and systems described herein (whether in reference to hardware, firmware, software, or a combination thereof) are vital to a 'green technology' future balanced with performance considerations.

Although the embodiments herein are described with reference to a processor, other embodiments are applicable to other types of integrated circuits and logic devices. Similar techniques and teachings of embodiments of the present invention can be applied to other types of circuits or semiconductor devices that can benefit from higher pipeline throughput and improved performance. The teachings of embodiments of the present invention are applicable to any processor or machine that performs data manipulations. However, the present invention is not limited to processors or machines that perform 512 bit, 256 bit, 128 bit, 64 bit, 32 bit, or 16 bit data operations and can be applied to any processor and machine in which manipulation or management of data is performed. In addition, the description herein provides examples, and the accompanying drawings show various examples for the purposes of illustration. However, these examples should not be construed in a limiting sense as they are merely intended to provide examples of embodiments of the present invention rather than to provide an exhaustive list of all possible implementations of embodiments of the present invention.

Although the below examples describe instruction handling and distribution in the context of execution units and logic circuits, other embodiments of the present invention can be accomplished by way of a data or instructions stored on a machine-readable, tangible medium, which when performed by a machine cause the machine to perform functions consistent with at least one embodiment of the invention. In one embodiment, functions associated with embodiments of the present invention are embodied in machine-executable instructions. The instructions can be used to cause a general-purpose or special-purpose processor that is programmed with the instructions to perform the steps of the present invention. Embodiments of the present invention may be provided as a computer program product or software which may include a machine or computer-readable medium having stored thereon instructions which may be used to program a computer (or other electronic devices) to perform one or more operations according to embodiments of the present invention. Alternatively, operations of embodiments of the present invention might be performed by specific hardware components that contain fixed-function logic for performing the operations, or by any combination of programmed computer components and fixed-function hardware components.

Instructions used to program logic to perform embodiments of the invention can be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer).

A design may go through various stages, from creation to simulation to fabrication. Data representing a design may represent the design in a number of manners. First, as is useful in simulations, the hardware may be represented using a hardware description language or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. In any representation of the design, the data may be stored in any form of a machine readable medium. A memory or a magnetic or optical storage such as a disc may be the machine readable medium to store information transmitted via optical or electrical wave modulated or otherwise generated to transmit such information. When an electrical carrier wave indicating or carrying the code or design is transmitted, to the extent that copying, buffering, or re-transmission of the electrical signal is performed, a new copy is made. Thus, a communication provider or a network provider may store on a tangible, machine-readable medium, at least temporarily, an article, such as information encoded into a carrier wave, embodying techniques of embodiments of the present invention.

A module as used herein refers to any combination of hardware, software, and/or firmware. As an example, a module includes hardware, such as a micro-controller, associated with a non-transitory medium to store code adapted to be executed by the micro-controller. Therefore, reference to a module, in one embodiment, refers to the hardware, which is specifically configured to recognize and/or execute the code to be held on a non-transitory medium. Furthermore, in another embodiment, use of a module refers to the non-transitory medium including the code, which is specifically adapted to be executed by the microcontroller to perform predetermined operations. And as can be inferred, in yet another embodiment, the term module (in this example) may refer to the combination of the microcontroller and the non-transitory medium. Often module boundaries that are illustrated as separate commonly vary and potentially overlap. For example, a first and a second module may share hardware, software, firmware, or a combination thereof, while potentially retaining some independent hardware, software, or firmware. In one embodiment, use of the term logic includes hardware, such as transistors, registers, or other hardware, such as programmable logic devices.

Use of the phrase 'configured to,' in one embodiment, refers to arranging, putting together, manufacturing, offering to sell, importing and/or designing an apparatus, hardware, logic, or element to perform a designated or determined task. In this example, an apparatus or element thereof that is not operating is still 'configured to' perform a designated task if it is designed, coupled, and/or interconnected to perform said designated task. As a purely illustrative example, a logic gate may provide a 0 or a 1 during operation. But a logic gate 'configured to' provide an enable signal to a clock does not include every potential logic gate that may provide a 1 or 0. Instead, the logic gate is one coupled in some manner that during operation the 1 or 0 output is to enable the clock. Note once again that use of the term 'configured to' does not require operation, but instead focus on the latent state of an apparatus, hardware, and/or element, where in the latent state the apparatus, hardware, and/or element is designed to perform a particular task when the apparatus, hardware, and/or element is operating.

Furthermore, use of the phrases 'to,' 'capable of/to,' and or 'operable to,' in one embodiment, refers to some apparatus, logic, hardware, and/or element designed in such a way to enable use of the apparatus, logic, hardware, and/or element in a specified manner. Note as above that use of to, capable to, or operable to, in one embodiment, refers to the latent state of an apparatus, logic, hardware, and/or element, where the apparatus, logic, hardware, and/or element is not operating but is designed in such a manner to enable use of an apparatus in a specified manner.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In one embodiment, a storage cell, such as a transistor or flash cell, may be capable of holding a single logical value or multiple logical values. However, other representations of values in computer systems have been used. For example the decimal number ten may also be represented as a binary value of 1010 and a hexadecimal letter A. Therefore, a value includes any representation of information capable of being held in a computer system.

Moreover, states may be represented by values or portions of values. As an example, a first value, such as a logical one, may represent a default or initial state, while a second value, such as a logical zero, may represent a non-default state. In addition, the terms reset and set, in one embodiment, refer to a default and an updated value or state, respectively. For example, a default value potentially includes a high logical value, i.e. reset, while an updated value potentially includes a low logical value, i.e. set. Note that any combination of values may be utilized to represent any number of states.

The embodiments of methods, hardware, software, firmware or code set forth above may be implemented via instructions or code stored on a machine-accessible, machine readable, computer accessible, or computer readable medium which are executable by a processing element. A non-transitory machine-accessible/readable medium includes any mechanism that provides (i.e., stores and/or transmits) information in a form readable by a machine, such as a computer or electronic system. For example, a non-transitory machine-accessible medium includes random-access memory (RAM), such as static RAM (SRAM) or dynamic RAM (DRAM); ROM; magnetic or optical storage medium; flash memory devices; electrical storage devices; optical storage devices; acoustical storage devices; other form of storage devices for holding information received from transitory (propagated) signals (e.g., carrier waves, infrared signals, digital signals); etc., which are to be distinguished from the non-transitory mediums that may receive information there from.

Instructions used to program logic to perform embodiments of the invention may be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer)

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the foregoing specification, a detailed description has been given with reference to specific exemplary embodiments. It will, however, be evident that various modifications and changes may be made thereto without departing from the broader spirit and scope of the invention as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but may refer to different and distinct embodiments, as well as potentially the same embodiment.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like. The blocks described herein can be hardware, software, firmware or a combination thereof.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "defining," "receiving," "determining," "issuing," "linking," "associating," "obtaining," "authenticating," "prohibiting," "executing," "requesting," "communicating," or the like, refer to the actions and processes of a computing system, or similar electronic computing device, that manipulates and transforms data represented as physical (e.g., electronic) quantities within the computing system's registers and memories into other data similarly represented as physical quantities within the computing system memories or registers or other such information storage, transmission or display devices.

The words "example" or "exemplary" are used herein to mean serving as an example, instance or illustration. Any aspect or design described herein as "example' or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Also, the terms "first," "second," "third," "fourth," etc. as used herein are meant as labels to distinguish among different elements and may not necessarily have an ordinal meaning according to their numerical designation.

What is claimed is:

1. A processor comprising:
    a cache;
    a processor core coupled to the cache; and
    a memory controller coupled between the processor core and main memory, wherein the main memory comprises a memory range comprising a section of convertible pages that are convertible to secure pages or non-secure pages, wherein each of the convertible pages comprises a plurality of data lines, and wherein the processor core, in response to a page conversion instruction, is to:
        determine from the page conversion instruction a convertible page in the memory range to be converted; and
        convert the convertible page to be at least one of a secure page or a non-secure page, wherein the processor core, to convert the convertible page, is to:
            change a bit in a page cache map corresponding to the convertible page, wherein the page cache map comprises an entry for each of the convertible pages in the section;
            invalidate cached page contents for the convertible page stored in the cache; and
            invalidate a translation mapping with an address of the convertible page.

2. The processor of claim 1, wherein the page conversion instruction is a first conversion instruction, and wherein the processor core is to convert the convertible page from a non-secure page to a secure page in response to the first conversion instruction.

3. The processor of claim 2, wherein the processor core is to perform the following in response to the first conversion instruction:
    ensure that the address of the convertible page points to a page that is convertible to a secure page;
    verify that the bit of the page cache map corresponding to the convertible page is set to be non-secure; and
    set the bit of the page cache map to be secure.

4. The processor of claim 1, wherein the page conversion instruction is a second conversion instruction, and wherein the processor core is to convert the convertible page from a secure page to a non-secure page in response to the second conversion instruction.

5. The processor of claim 4, wherein the processor core is to perform the following in response to the second conversion instruction:
ensure that address of the convertible page points to a page that is convertible to a non-secure page;
verify that the bit of the page cache map corresponding to the convertible page is set to be secure;
verify that a valid bit of the page cache map is set to invalid; and
set the bit of the page cache map to be non-secure.

6. The processor of claim 1, wherein the memory range further comprises a hardware reserved section, wherein the processor core, in response to a section conversion instruction, is to convert the hardware reserved section to be at least one of a secure section or a non-secure section.

7. The processor of claim 6, wherein the section conversion instruction is a third conversion instruction, and wherein the processor core is to convert the hardware reserved section from a non-secure section to a secure section in response to the third conversion instruction.

8. The processor of claim 7, further comprising a memory encryption engine (MEE) coupled between the processor core and the main memory, wherein the processor core is to perform the following in response to the third conversion instruction:
ensure that an address of the third conversion instruction points to a page in the hardware reserved section;
ensure that the hardware reserved section of the memory range is set as convertible, currently non-secure;
instruct the MEE to install a replay-protection filter for the hardware reserved section; and
instruct the MEE to put the hardware reserved section in an initialized state.

9. The processor of claim 6, wherein the section conversion instruction is a fourth conversion instruction, and wherein the processor core is to convert the hardware reserved section from a secure section to a non-secure section in response to the fourth conversion instruction.

10. The processor of claim 9, further comprising a memory encryption engine (MEE) coupled between the processor core and the main memory, wherein the processor core is to perform the following in response to the fourth conversion instruction:
ensure that an address of the fourth conversion instruction points to a page in the hardware reserved section;
ensure that the convertible pages in the section corresponding to the hardware reserved section are in a non-secure state;
instruct the MEE to uninstall a replay-protection filter for the hardware reserved section; and
instruct the MEE to flush contents of the hardware reserved section from its internal cache.

11. The processor of claim 6, wherein the memory range further comprises another hardware reserved section that cannot be converted.

12. The processor of claim 11, wherein the main memory comprises a non-secure memory range.

13. A method comprising:
decoding, by a processor core of a processor, a page conversion instruction to convert a convertible page in a memory range in main memory coupled to the processor core, wherein the memory range comprises a section of convertible pages that are convertible to secure pages or non-secure pages; and
executing, by the processor core, the page conversion instruction to convert the convertible page to be at least one of a secure page or a non-secure page wherein the executing further comprises:
changing a bit in a page cache map corresponding to the convertible page, wherein the page cache map comprises an entry for each of the convertible pages in the section;
invalidating cached page contents for the convertible page stored in a cache; and
invalidating a translation mapping with an address of the convertible page.

14. The method of claim 13, further comprising:
converting, by the processor core, the convertible page from a non-secure page to a secure page when the page conversion instruction is a first conversion instruction; and
converting, by the processor core, the convertible page from the secure page to the non-secure page when the page conversion instruction is a second conversion instruction.

15. The method of claim 14, further comprising:
in response to the first conversion instruction,
ensuring that the address of the convertible page points to a page that is convertible to a secure page;
verifying that the bit of the page cache map corresponding to the convertible page is set to be non-secure; and
setting the bit of the page cache map to be secure.

16. The method of claim 14, further comprising:
in response to the second conversion instruction,
ensuring that the address of the convertible page points to a page that is convertible to a non-secure page;
verifying that the bit of the page cache map corresponding to the convertible page is set to be secure;
verifying that a valid bit of the page cache map is set to invalid; and
setting the bit of the page cache map to be non-secure.

17. The method of claim 14, wherein the memory range further comprises a hardware reserved section, the method further comprises:
decoding, by the processor core, a section conversion instruction to convert the hardware reserved section in the memory range; and
executing the section conversion instruction to convert the hardware reserved section to be at least one of a secure section or a non-secure section.

18. The method of claim 17, further comprising:
converting, by the processor core, the hardware reserved section from a non-secure section to a secure section when the section conversion instruction is a third conversion instruction; and
converting, by the processor core, the hardware reserved section from the secure section to the non-secure section when the section conversion instruction is a fourth conversion instruction.

19. The method of claim 18, further comprising:
in response to the third conversion instruction:
ensuring that an address of the third conversion instruction points to a page in the hardware reserved section;
ensuring that the hardware reserved section of the memory range is set as convertible, currently non-secure;

instructing a memory encryption engine (MEE) coupled between the processor core and the main memory to install a replay-protection filter for the hardware reserved section;

instructing the MEE to put the hardware reserved section in an initialized state; and in response to the fourth conversion instruction:
ensuring that an address of the fourth conversion instruction points to a page in the hardware reserved section;
ensure that the convertible pages in the section corresponding to the hardware reserved section are in a non-secure state;
instructing the MEE to uninstall the replay-protection filter for the hardware reserved section; and
instructing the MEE to flush contents of the hardware reserved section from its internal cache.

20. A system comprising:
a cache;
a processor coupled to the processor, the processor comprising a plurality of functional units to execute instructions; and
a memory device coupled to the processor, wherein the memory device is operable to store code memory and data memory and comprises a memory range comprising a section of convertible pages that are convertible to secure pages or non-secure pages, wherein the processor is to:
decode a page conversion instruction to convert a convertible page in the memory range; and
execute the page conversion instruction to convert the convertible page to be at least one of a secure page or a non-secure page, wherein the processor, to execute the page conversion instruction, is further to:
change a bit in a page cache map corresponding to the convertible page, wherein the page cache map comprises an entry for each of the convertible pages in the section;
invalidate cached page contents for the convertible page stored in the cache; and
invalidate a translation mapping with an address of the convertible page.

21. The system of claim 20, wherein the page conversion instruction is a first conversion instruction, and wherein the processor is to convert the convertible page from a non-secure page to a secure page in response to the first conversion instruction, and wherein the processor is to perform the following in response to the first conversion instruction:
ensure that the address of the convertible page points to a page that is convertible to a secure page;
verify that the bit of the page cache map corresponding to the convertible page is set to be non-secure; and
set the bit of the page cache map to be secure.

22. The system of claim 20, wherein the page conversion instruction is a second conversion instruction, and wherein the processor is to convert the convertible page from a secure page to a non-secure page in response to the second conversion instruction, and wherein the processor is to perform the following in response to the second conversion instruction:
ensure that an address of the convertible page points to a page that is convertible to a non-secure page;
verify that the bit of the page cache map corresponding to the convertible page is set to be secure;
verify that a valid bit of the page cache map is set to invalid; and
set the bit of the page cache map to be non-secure.

23. The system of claim 20, wherein the memory range further comprises a hardware reserved section, wherein the processor, in response to a section conversion instruction, is to:
decode the section conversion instruction to convert the hardware reserved section; and
execute the section conversion instruction to convert the hardware reserved section to be at least one of a secure section or a non-secure section.

24. The system of claim 23, further comprising a memory encryption engine (MEE) coupled between the processor and the memory device, wherein the section conversion instruction is a third conversion instruction, and wherein the processor is to convert the hardware reserved section from a non-secure section to a secure section in response to the third conversion instruction, wherein the processor is to perform the following in response to the third conversion instruction:
ensure that an address of the third conversion instruction points to a page in the hardware reserved section;
ensure that the hardware reserved section of the memory range is set as convertible, currently non-secure;
instruct the MEE to install a replay-protection filter for the hardware reserved section; and
instruct the MEE to put the hardware reserved section in an initialized state.

25. The system of claim 23, further comprising a memory encryption engine (MEE) coupled between the processor and the memory device, wherein the section conversion instruction is a fourth conversion instruction, and wherein the processor is to convert the hardware reserved section from a secure section to a non-secure section in response to the fourth conversion instruction, wherein the processor is to perform the following in response to the fourth conversion instruction:
ensure that an address of the fourth conversion instruction points to a page in the hardware reserved section;
ensure that the convertible pages in the section corresponding to the hardware reserved section are in a non-secure state;
instruct the MEE to uninstall a replay-protection filter for the hardware reserved section; and
instruct the MEE to flush contents of the hardware reserved section from its internal cache.

* * * * *